US010092812B2

(12) United States Patent
Eisner

(10) Patent No.: US 10,092,812 B2
(45) Date of Patent: *Oct. 9, 2018

(54) DISPARITY CORRECTION FOR LOCATION-AWARE DISTRIBUTED SPORTING EVENTS

(71) Applicant: Seth E. Eisner Trust, Seattle, WA (US)

(72) Inventor: Seth Eisner, Shawnee on Del, PA (US)

(73) Assignee: Seth E. Eisner Trust, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/701,404

(22) Filed: Sep. 11, 2017

(65) Prior Publication Data

US 2018/0065023 A1 Mar. 8, 2018

Related U.S. Application Data

(63) Continuation of application No. 14/103,561, filed on Dec. 11, 2013, now Pat. No. 9,757,639, and a
(Continued)

(51) Int. Cl.
 *A63B 71/06* (2006.01)
 *A63K 1/00* (2006.01)
(Continued)

(52) U.S. Cl.
 CPC ............ *A63B 71/0616* (2013.01); *A63K 1/00* (2013.01); *A63K 3/00* (2013.01); *G01S 19/19* (2013.01);
(Continued)

(58) Field of Classification Search
 CPC ........ A63B 71/0616; A63K 1/00; A63K 3/00; G01S 19/19; G06F 15/17306; G06F 17/40
 See application file for complete search history.

(56) References Cited

U.S. PATENT DOCUMENTS 3,810,120 A 5/1974 Huettner
4,372,558 A 2/1983 Shimamoto et al.
(Continued)

FOREIGN PATENT DOCUMENTS

GB 2293111 3/1996
WO 03088584 10/2003
WO 09078740 6/2009

*Primary Examiner* — Omkar Deodhar
*Assistant Examiner* — Matthew D. Hoel
(74) *Attorney, Agent, or Firm* — Benedict R. Dugan; Lowe Graham Jones PLLC

(57) ABSTRACT

Various embodiments facilitate location-aware distributed competitions. In one embodiment, a system facilitates a distributed sporting event that includes multiple players traveling over non-uniform courses that are remote from one another. The system includes a manager that receives state information, such as location information, from client devices used by each of the players. The manager then transmits location information for each of the players to the client devices, which are each configured to present a graphical representation, such as a map annotated with the locations of each of the players. The system corrects for disparities between the non-uniform courses traveled by the players, for example by mapping a location on a course traveled by a first player to a location on a course traveled by a second player. Various mechanisms for establishing the mapping between non-uniform courses are also described.

20 Claims, 20 Drawing Sheets

Related U.S. Application Data continuation-in-part of application No. 13/717,287, filed on Dec. 17, 2012, now Pat. No. 8,897,903, which is a continuation of application No. 13/077,682, filed on Mar. 31, 2011, now Pat. No. 8,333,643, which is a continuation of application No. 12/816,981, filed on Jun. 16, 2010, now Pat. No. 7,934,983.

(60) Provisional application No. 61/818,691, filed on May 2, 2013, provisional application No. 61/264,151, filed on Nov. 24, 2009.

(51) Int. Cl.
  *A63K 3/00* (2006.01)
  *G01S 19/19* (2010.01)
  *G06F 15/173* (2006.01)
  *G06F 17/40* (2006.01)

(52) U.S. Cl.
  CPC ........ *G06F 15/17306* (2013.01); *G06F 17/40* (2013.01)

(56) References Cited

U.S. PATENT DOCUMENTS

| | | |
|---|---|---|
| 4,868,560 A | 9/1989 | Oliwa et al. |
| 4,872,686 A | 10/1989 | Trasko |
| 5,083,271 A | 1/1992 | Thacher et al. |
| 5,283,733 A | 2/1994 | Colley |
| 5,317,321 A | 5/1994 | Sass |
| 5,397,133 A | 3/1995 | Penzias |
| 5,507,485 A | 4/1996 | Fisher |
| 5,674,127 A | 10/1997 | Horstmann et al. |
| 5,731,788 A | 3/1998 | Reeds |
| 5,835,697 A | 11/1998 | Watabe et al. |
| 5,937,133 A | 8/1999 | Moss et al. |
| 6,013,007 A | 1/2000 | Root et al. |
| 6,070,243 A | 5/2000 | See et al. |
| 6,080,063 A | 6/2000 | Khosla |
| 6,117,007 A | 9/2000 | Matsuyama et al. |
| 6,177,905 B1 | 1/2001 | Welch |
| 6,278,945 B1 | 8/2001 | Lin |
| 6,287,200 B1 | 9/2001 | Sharma |
| 6,306,038 B1 | 10/2001 | Graves et al. |
| 6,320,495 B1 | 11/2001 | Sporgis |
| 6,544,121 B2 | 4/2003 | DeWeese et al. |
| 6,579,175 B2 | 6/2003 | Suzuki |
| 6,705,942 B1 | 3/2004 | Crook et al. |
| 6,902,513 B1 | 6/2005 | McClurre |
| 6,932,698 B2 | 8/2005 | Sprogis |
| 6,937,165 B2 | 8/2005 | Rogers |
| 7,038,973 B1 | 5/2006 | Merlino |
| 7,339,470 B2 | 3/2008 | Scott |
| 7,454,715 B2 | 11/2008 | Chen et al. |
| 7,457,583 B2 | 11/2008 | Katayama |
| 7,603,255 B2 | 10/2009 | Case, Jr. et al. |
| 7,625,314 B2 | 12/2009 | Ungari et al. |
| 7,733,808 B2 | 6/2010 | Hu et al. |
| 2001/0010541 A1 | 8/2001 | Fernandez et al. |
| 2002/0004723 A1 | 1/2002 | Meifu et al. |
| 2002/0016674 A1 | 2/2002 | Rudow et al. |
| 2002/0027524 A1 | 3/2002 | Pippin |
| 2002/0156649 A1 | 10/2002 | Edgar |
| 2003/0069072 A1 | 4/2003 | Miura |
| 2003/0073473 A1 | 4/2003 | Mori |
| 2003/0153374 A1 | 8/2003 | Gilmore |
| 2003/0220143 A1 | 11/2003 | Shteyn et al. |
| 2004/0002843 A1 | 1/2004 | Robarts et al. |
| 2004/0147329 A1 | 7/2004 | Meadows et al. |
| 2004/0176082 A1 | 9/2004 | Cliff et al. |
| 2005/0009608 A1 | 1/2005 | Robarts et al. |
| 2005/0059495 A1 | 3/2005 | Horowitz et al. |
| 2005/0101415 A1 | 5/2005 | Sweeney |
| 2005/0227791 A1 | 10/2005 | McCreary et al. |
| 2005/0250590 A1 | 11/2005 | Doaga et al. |
| 2006/0154713 A1 | 7/2006 | Sunazuka et al. |
| 2007/0026919 A1 | 2/2007 | Klitsner et al. |
| 2007/0060408 A1 | 3/2007 | Schultz et al. |
| 2007/0111768 A1 | 5/2007 | Tipping et al. |
| 2007/0290801 A1 | 12/2007 | Powell |
| 2008/0027607 A1 | 1/2008 | Ertl et al. |
| 2008/0039203 A1 | 2/2008 | Ackley et al. |
| 2008/0092202 A1 | 4/2008 | Greenquist et al. |
| 2008/0201107 A1 | 8/2008 | Doherty et al. |
| 2008/0278314 A1 | 11/2008 | Miller et al. |
| 2009/0005140 A1 | 1/2009 | Rose et al. |
| 2009/0063419 A1 | 3/2009 | Nurminen et al. |
| 2009/0076784 A1 | 3/2009 | Ong et al. |
| 2009/0240354 A1 | 9/2009 | Davidson |
| 2009/0256688 A1 | 10/2009 | Khan |
| 2009/0259566 A1 | 10/2009 | White, III et al. |
| 2009/0275413 A1 | 11/2009 | Rusiniak |
| 2010/0004097 A1 | 1/2010 | D'Eredita |
| 2010/0041517 A1 | 2/2010 | Ungari et al. |
| 2010/0109948 A1 | 5/2010 | Razoumov et al. |
| 2010/0210421 A1 | 8/2010 | Case, Jr. et al. |

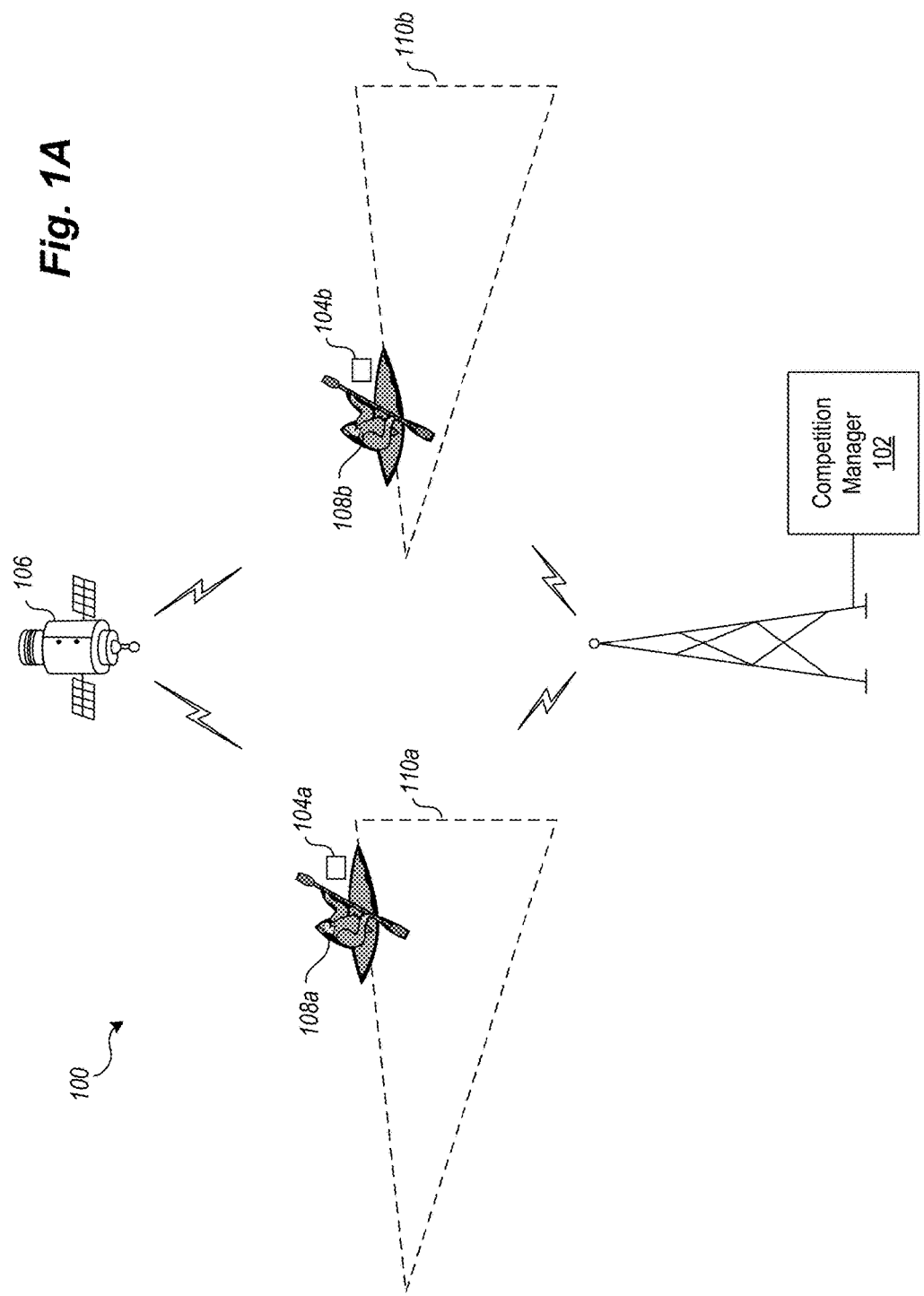

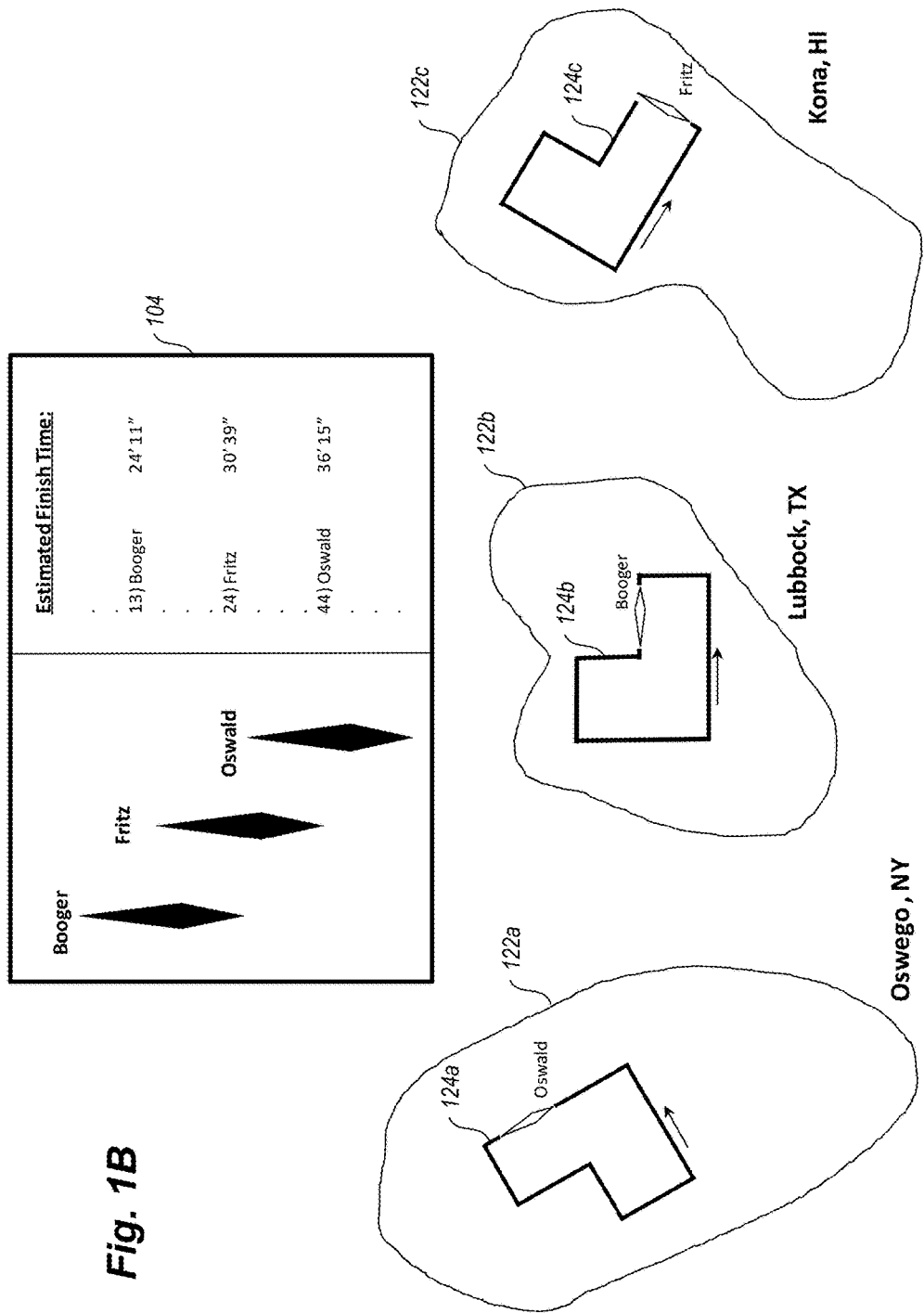

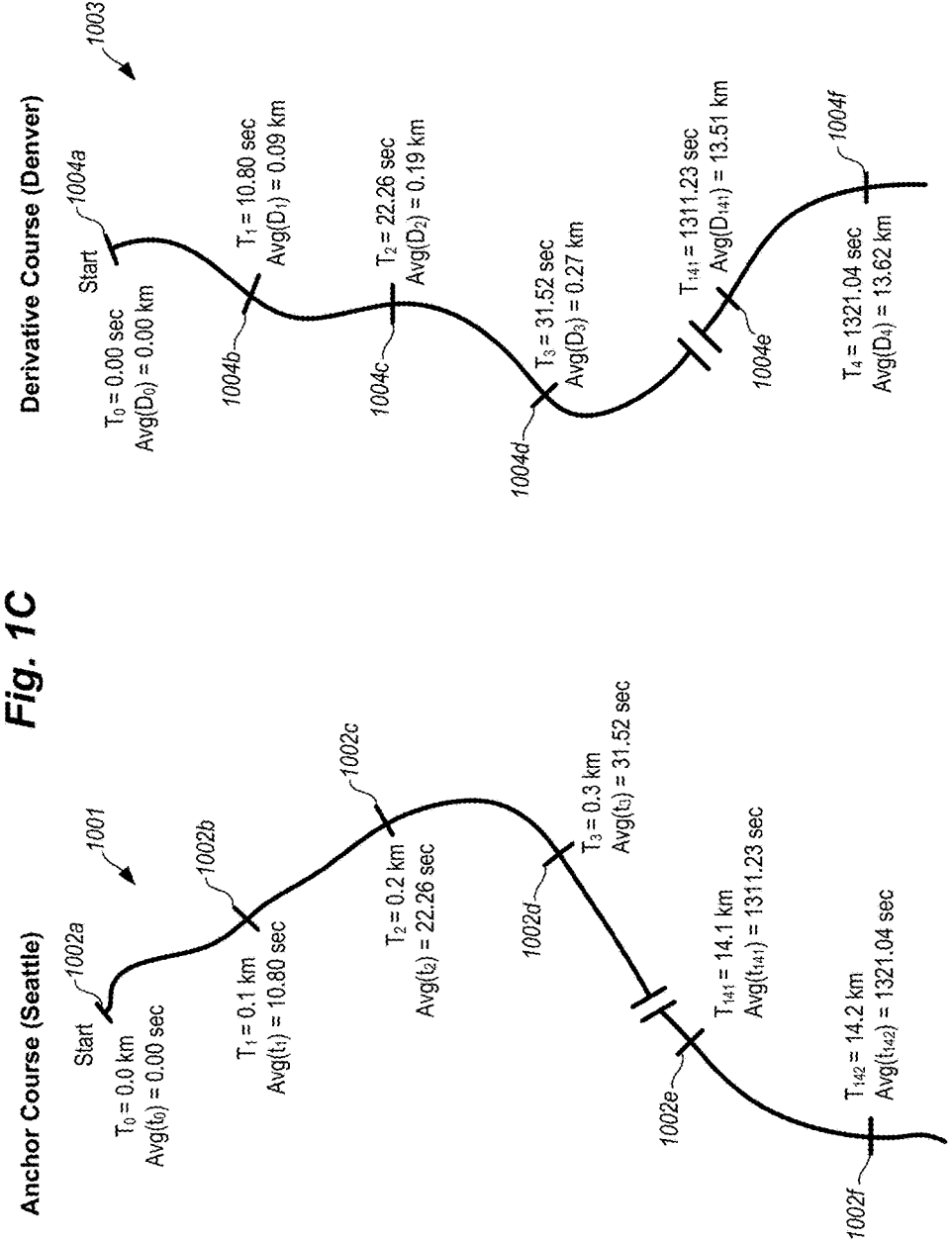

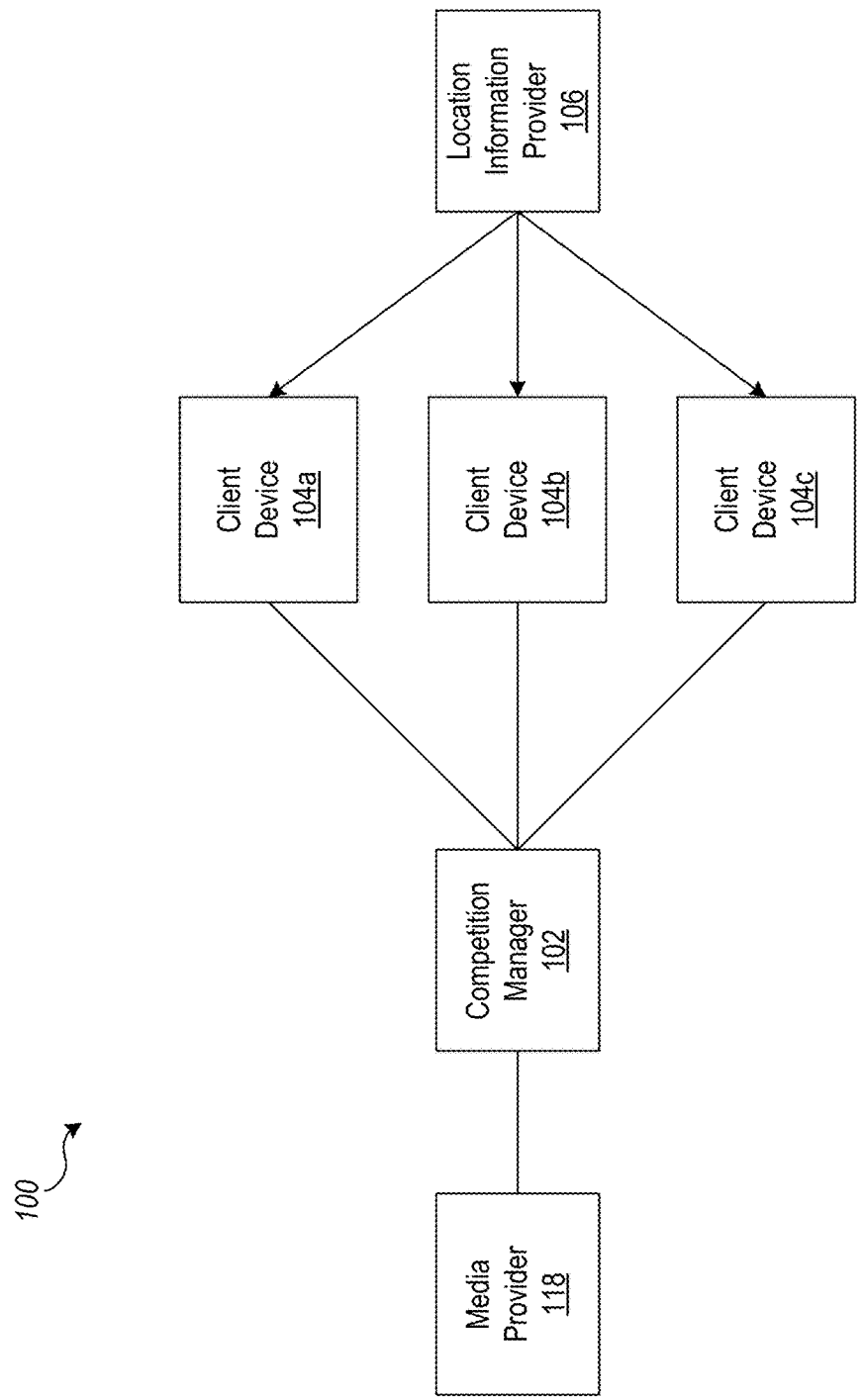

Fig. 3A
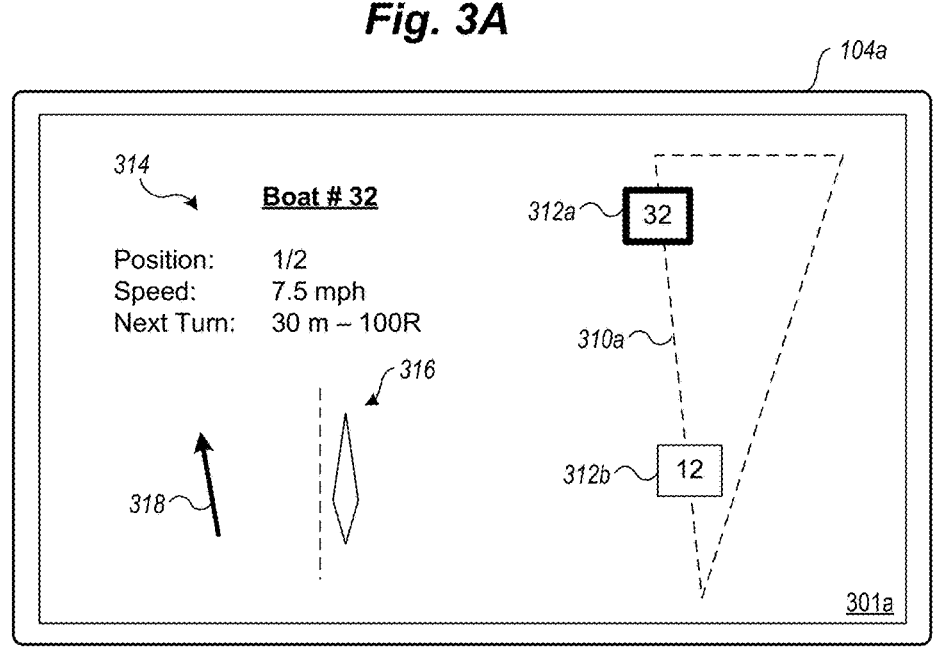
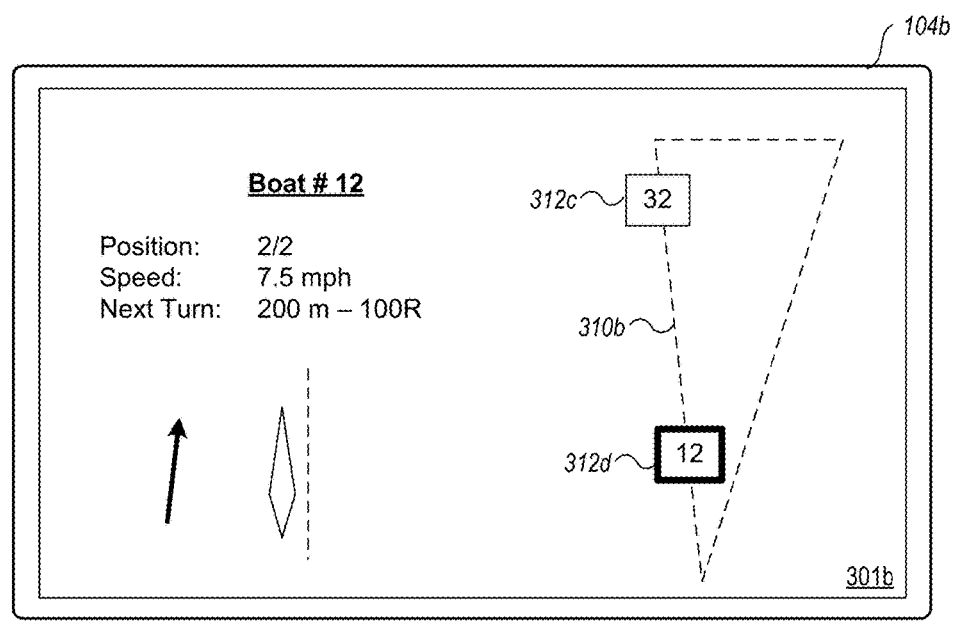

DISPARITY CORRECTION FOR LOCATION-AWARE DISTRIBUTED SPORTING EVENTS

CROSS-REFERENCE TO RELATED APPLICATIONS

This application is a continuation of U.S. application Ser. No. 14/103,561, entitled "DISPARITY CORRECTION FOR LOCATION-AWARE DISTRIBUTED SPORTING EVENTS," filed Dec. 11, 2013, now U.S. Pat. No. 9,757,639, which claims the benefit of U.S. Provisional Application No. 61/818,691, entitled "DISPARITY CORRECTION FOR LOCATION-AWARE DISTRIBUTED SPORTING EVENTS," filed May 2, 2013. U.S. application Ser. No. 14/103,561 is also a continuation-in-part of U.S. application Ser. No. 13/717,287, entitled "LOCATION-AWARE DISTRIBUTED SPORTING EVENTS," filed Dec. 17, 2012, now U.S. Pat. No. 8,897,903, which is a continuation of U.S. application Ser. No. 13/077,682 entitled "LOCATION-AWARE DISTRIBUTED SPORTING EVENTS," filed Mar. 31, 2011, now U.S. Pat. No. 8,333,643, which is a continuation of U.S. application Ser. No. 12/816,981, entitled "LOCATION-AWARE DISTRIBUTED SPORTING EVENTS," filed Jun. 16, 2010, now U.S. Pat. No. 7,934,983, which claims the benefit of U.S. Provisional Application No. 61/264,151, entitled "SYSTEMS AND METHODS FOR LOCATION-AWARE DISTRIBUTED COMPETITIONS," Nov. 24, 2009. All of which are incorporated herein by reference in their entireties.

TECHNICAL FIELD

The technical field relates to location-aware distributed competition and more particularly, to apparatus, systems, methods and techniques for facilitating a distributed sporting event that includes multiple players traveling over non-uniform courses that are remote from one another.

BRIEF DESCRIPTION OF THE DRAWINGS

The components in the drawings are not necessarily to scale relative to each other. Like reference numerals designate corresponding parts throughout the several views.

FIG. 1A shows an example distributed sporting event facilitator system deployed in an example environment.

FIG. 1B illustrates aggregation of individual sporting activities that are occurring at locations and upon courses that are remote from one another.

FIG. 1C illustrates example anchor and derivative courses according to an example embodiment that corrects disparities between non-uniform courses.

FIGS. 2A-2B are block diagrams illustrating functional elements of an example embodiment of an example distributed sporting event facilitator system.

FIGS. 3A-3F are block diagrams illustrating example client device user interface aspects according to various example embodiments.

DETAILED DESCRIPTION

Figure 2B:
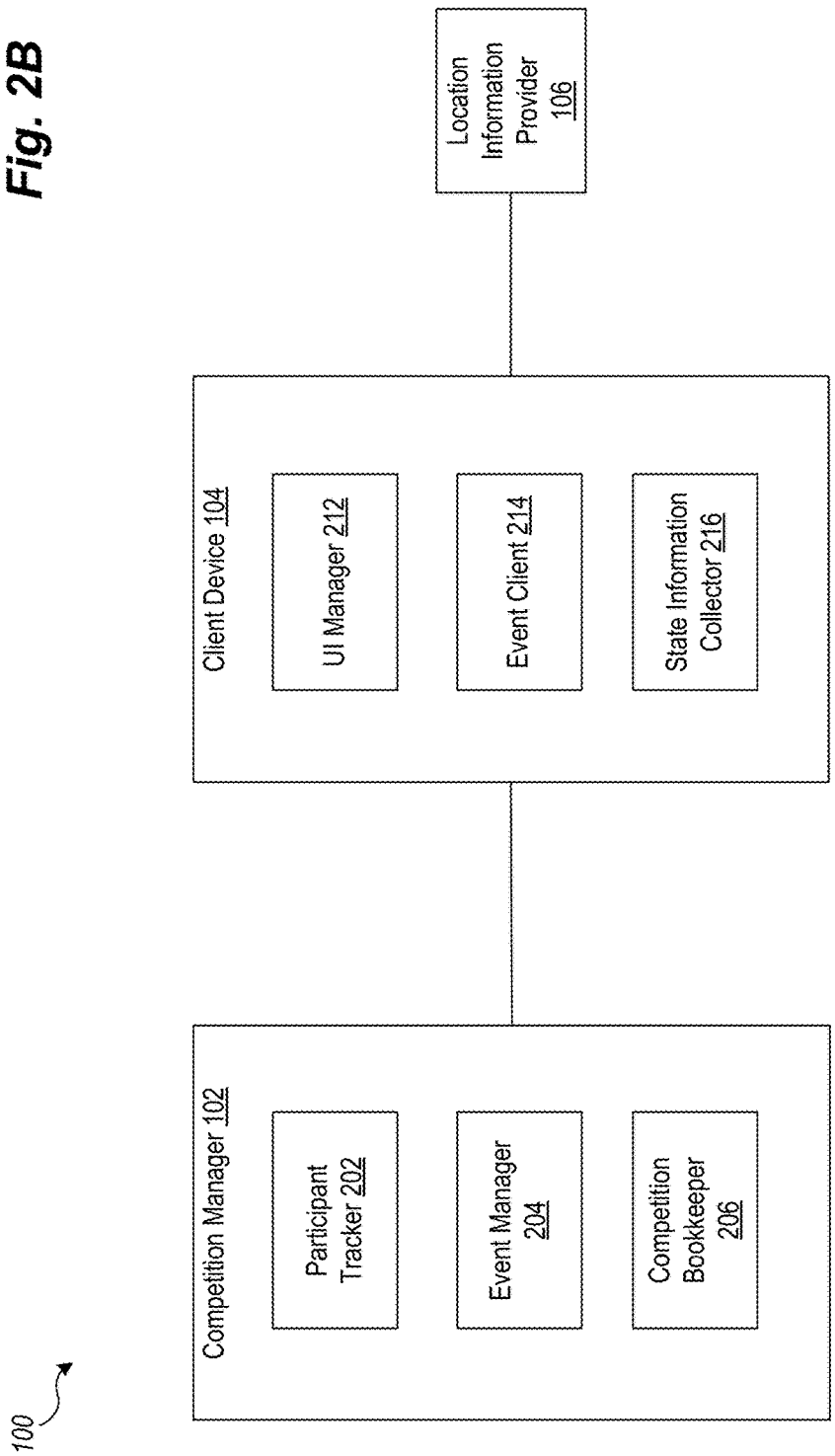

The described techniques facilitate a distributed sporting event that includes multiple players traveling over courses that are remote from one another. In some embodiments, the courses are non-uniform, irregular, or otherwise disparate, such that competitor's positions must be normalized, corrected, handicapped, or otherwise adjusted in order to provide a reasonably fair competitive environment. Example techniques for correcting for disparities between courses are described below with reference to FIGS. 1C and 2D. The disparity correction techniques can be practiced in the context of the distributed sporting event framework described herein.

A. Example Distributed Sporting Event

FIG. 1A shows an example distributed sporting event facilitator system 100 deployed in an example environment. In the embodiment illustrated in FIG. 1A, the system 100 includes a competition manager (i.e., an event controller) 102, a location information provider 106, and client devices 104a and 104b. The client devices are wirelessly communicatively coupled to the location information provider 106 and to the competition manager 102. The system 100 is facilitating a distributed sporting event (a kayak race, in this example) by aggregating a plurality of individual sporting activities into a distributed sporting event that includes two players 108a and 108b. The players 108a and 108b are each performing individual sporting activities, each competing against one another, and each remotely located from the other player. In this example, the players 108a and 108b are respectively racing kayaks about courses 110a and 110b.

In the illustrated example of FIG. 1A, each course 110a and 110b is situated at a location distinct and remote from the other, such as upon two distinct lakes, at two distinct locations on a single body of water, or the like. In other embodiments, there may be a single course on the same body of water, such as a sail boat race from California to Hawaii or a kayak race on Lake Michigan, a canoe race on a river with many bends, or a bike race over a mountainous area. In such competitions, the competitors may be on the same course, but natural obstacles or large distances prevent them from seeing one another and being able to gauge their progress as compared to other competitors. In still other embodiments, there may be multiple courses on the same body of water, such as two separate kayak courses on Lake Michigan.

The client devices 104a and 104b are used by their respective corresponding players 108a and 108b to obtain information about the distributed sporting event, such as the locations of the other players. In particular, from time to time, each client device 104a and 104b transmits state information to the competition manager 102. The transmitted state information includes an indication of the location of the client device and/or player, as determined in cooperation with the location information provider 106. In one embodiment, the location information provider includes one or more satellites that transmit a signal that can be used by a client device 104a and 104b to determine the location of the device. The competition manager 102 then transmits to the client devices 104a and 104b indications of the locations of the client devices 104a and 104b. In turn, the client devices 104a and 104b present, such as on a graphical display, information about the distributed sporting event, such as indications of the locations of the other players superimposed upon a graphical representation of the race course.

In addition, the competition manager 102 "asserts" a course corresponding to each of the players. In asserting the course, the competition manager 102 imposes a race course over a region or location at which a player is traveling. Asserting the course includes providing specific instructions to each player to travel over a specified path (e.g., a continuously bounded route over which a player moves) and/or to travel in a specified direction. Such instructions may include directions to turn one way or another, warnings (e.g., visual and/or auditory indications) that a player is nearing a course boundary, penalties (e.g., time or point penalty, disqualification) for players who cross course boundaries, and the like. Asserting the course may also include determining the actual or likely location of a player, and determining if that location is within or near the boundaries of a course. In some embodiments, the asserted course is continuous in nature, in that the competition manager 102 causes the players to stay within course boundaries at all times during the event.

The client devices 104a and 104b are at or near the same location as their respective player, within the tolerances needed to make the devices usable by their respective players for purposes of competing in such a race. For example, a client device can be coupled and adjacent to a player by being mounted on the player's body or clothing, the kayak or other boat the player is in, the player's bicycle, the player's mode of transport, or the like. The client devices 104 are therefore considered to be "co-located" with the player, namely in the same location as, and moving with, the player.

In some embodiments, two or more players may wish to race each other but live in different locations, such as Boston and San Diego. Of course, the different players can be in any separate city, state, or country, such as Louisiana and Seattle or France and Argentina. Course information can be transmitted to and programmed into the player's respective client devices, indicating to the players the beginning of the event, where to turn, how to paddle, and other actions, even though no physical buoys or other course markers are present at the player's respective locations. Thus, all players can compete on the same course as the other competitors, even though they are all at different locations that do not include any indications of the course.

FIG. 1B illustrates aggregation of individual sporting activities that are occurring at locations and upon courses that are remote from one another. In particular, FIG. 1B shows three different and distinct lakes 122a-122c, respectively located at or near Oswego, N.Y.; Lubbock, Tex.; and Kona, Hi. On each of the lakes 122a-122c, a player (e.g., Oswald, Booger, and Fritz) is racing a kayak about a respective course 124a-124c. In this example, the courses are substantially or nearly the same shape and dimensions, but are oriented differently and are asserted in different physical locales. As discussed above, the competition manager 102 receives location information from client devices used by each of the players, causes the client devices to display indications of the positions of the players, and asserts a course to each of the players. An example client device 104 is shown, displaying a virtual overlay of relative positions of the players Booger, Fritz, and Oswald, along with their estimated finish times.

Although kayaking is used herein as an example domain for describing a distributed sporting event facilitator system, other domains are suitable as well. Other example distributed sporting events include bicycling (e.g., track racing, road racing, mountain biking), distance running/walking (e.g., trail running, marathons, ultra marathons, competitive walking), other boating disciplines (e.g., rowing, canoeing, sculling, sailing, power boat racing), motorsports (e.g., rally driving, track racing), and the like.

Also, the example distributed sporting event facilitator system is herein described as typically managing the concurrent performances of multiple players. For example, a given distributed sporting event begins at the same time, that is, the players begin racing at or about the same time (e.g., simultaneously). In other embodiments, players may compete in a time-shifted manner, such that a player can compete against recordings of past performances of himself or other players.

B. Functional Aspects of an Example System

FIGS. 2A-2B are block diagrams illustrating functional elements of an example embodiment of an example distributed sporting event facilitator system 100.

As shown in FIG. 2A, the system 100 includes a competition manager 102, a plurality of client devices 104a-104c, a location information provider 106, and a media provider 118. The competition manager 102 facilitates a distributed sporting event by aggregating a plurality of individual sporting activities that are each performed by one of a plurality of players. The plurality of players are each competing against one another by traveling over a course situated at a location that is remote from or otherwise not in visual contact with the other players. A player is any human participant or competitor in the distributed sporting event. In the kayaking example of FIG. 1A, each player competes (e.g., races) against the other players by traveling in a boat (e.g., kayak, canoe, rowboat) over different courses at the same time. Each course is situated upon a different lake or some other body of water. Each of the players uses a respective one of the plurality of client devices 104a-104c to obtain information about the locations of the other players. Each of the client devices 104a-104c displays, in substantially or near real time, an indication of the location of each of the players with respect to their travel about their respective course. Thus, each player can ascertain their respective position in the race, and continuously receive feedback regarding the effects of an increase or decrease in physical output.

The competition manager 102 facilitates the distributed sporting event by receiving state information from each of the client devices 104a-104c. State information received from one client device includes, for example, an indication of the location of the client device and thus the location of the player using the client device. Each client device 104a-104c is configured to determine its location with the assistance of the location information provider 106. For example, the location information provider 106 may be or include one or more satellites that transmit a signal, such as a Global Positioning System ("GPS") signal, that may be used by a client device to determine its location. Each client device 104a-104c transmits state information in response to a passage of time (e.g., every 10 seconds) or some other condition, such as when the client device has moved a predetermined distance from the location of a previous transmission, when the client device is queried for its location by the competition manager 102, or the like.

The competition manager 102 updates, based on the received state information, a model of the distributed sporting event. The model includes any data structure or arrangement configured to represent the locations of, and possibly other information about, each of the players in the sporting event. In some embodiments, updating the model of the distributed sporting event includes translating indications of player locations from one coordinate system into another. In particular, indications of the "physical" or "global" locations of the players may be converted into corresponding indications of "virtual" or "course" locations of the players. The physical location of a player is the location of the player with respect to a shared, uniform, global coordinate system, such as a planet-wide latitude and longitude coordinate system. In contrast, the course location of a player is the location of a player with respect to a course over which the player is traveling. A course may be or refer to an actual physical course traveled by the player, or a single, shared, uniform, virtual course being "traveled" by all of the plurality of players. Translating player locations may include mapping physical locations onto a virtual course location. By translating or mapping the physical player locations into course locations, the competition manager 102 can more readily compare player locations, such as to determine the respective rankings of the players (e.g., who is winning the race). Also, the translated locations can be transmitted to the client devices 104a-104c such that each device can more readily display the locations of the players in conjunction with one another, so as to make it appear that the players are all competing on a single, shared course, even though they are actually traveling over courses that are located remotely from one another.

The competition manager 102 transmits to each of the client devices 104a-104c information about the updated sporting event model. Transmitting information about the updated sporting event model includes transmitting indications of the locations of the plurality of players. In response, each of the client devices 104a-104c presents the received information to its corresponding player. Presenting the received information includes, for example, displaying a map or other graphical representation of the course, annotated with indications of the locations of the various players. As the players move about their respective courses, their corresponding client devices continuously update their displays in substantially or near real time with respect to the motions of the players. In this manner, each of the players receives information about his or her position with respect to the other players.

The competition manager 102 asserts the course to each of the plurality of players by causing each of the client devices 104a-104c to present specific instructions to the corresponding player to travel over a specified course. Asserting the course may include sending a message to a player to travel in a specified direction (e.g., turn left), alarms or other signals to warn a player that he is nearing a course boundary, assessing penalties to players that cross course boundaries, and the like. Asserting a course may also include determining the location of a player with respect to the course. For example, the competition manager 102 may determine whether a player has crossed, or is nearing, a course boundary, and based on that determination, transmit specific instructions to the player to travel in a direction that will take him to a location within the course boundary.

The competition manager 102 may also take various actions in the presence of uncertainty about the location of a particular player. Such uncertainty may be due to unreliable communication channels caused by various factors, including wireless signal attenuation, client device hardware failure, client device power failure, environmental conditions, and the like. In other cases, GPS equipment may provide erroneous readings, such that even though the competition manager 102 has recently received location information from a client device, that location information is associated with a high degree of uncertainty.

In one embodiment, the competition manager 102 determines that information has not been received from at least one of the plurality of players (e.g., within a specified time interval), and in response, determines a likely position for the at least one player, based at least in part on last known location information (e.g., position, orientation, speed of travel) for the at least one player. Various approaches to determining a likely position for a player are contemplated. In one approach, the competition manager 102 performs linear extrapolation based on two previously received location points, according to the following function, where $(x_{k-1}, y_{k-1})$ and $(x_k, y_k)$ are the two points nearest the point x* to be extrapolated:

$$y(x_*) = y_{k-1} + \frac{x_* - x_{k-1}}{x_k - x_{k-1}}(y_k - y_{k-1}).$$

A second approach may be used in other circumstances, such as near the end of an event, when even a fatigued a participant will sprint (e.g., over-exert) to the finish line. A linear solution as discussed above may be inadequate here, and a multivariate and/or polynomial approach may be used instead. Various polynomial approaches are contemplated, including generating a Newton series or Lagrange polynomial to fit the data and using the resulting polynomial to perform extrapolation.

Various other actions may be taken by the competition manager 102 in response to a determination that communication with a client device has failed. In one embodiment, if communication with a client device fails for longer than a predetermined amount of time (e.g., one minute) a participant removal (e.g., disqualification) notification will be sent to the client device. The amount of time may also be based at least in part on the current state of the sporting event. For example, if players are nearing the finish line, the competition manager 102 may require more frequent communication in order to make an accurate determination of which player won the event.

As another advantage provided by the described techniques, there is no need for judges or other officials to observe the players, because the competition manager 102 keeps track of how far and fast each player has moved, when the player turns, where the player turns, and other information so that even if one player cuts the course short or turns too soon, this can be detected by the competition manager 102, and handled by taking the appropriate action. In some cases, the competition manager 102 issues a warning or other instruction to return to the course. In other cases, the competition manager 102 adds an appropriate amount of time for the distance that should have been traveled, based on the average travel speed, wind speed compensation, and other factors. Other actions performed by the competition manager 102 may be similarly incorporated.

Additional features are contemplated. For example, in one embodiment, the competition manager 102 handicaps players and/or courses by correcting for a disparity between at least some of the players. Various factors impact the performance of each player, including player-related factors, such as player strength, endurance, age, experience, and the like; course conditions, such as terrain, weather conditions, and the like; etc. Such factors may result in races that are not "fair," such as when an adult competes against a child, when one player with a tailwind competes against another player with a headwind, or the like. In some embodiments, the competition manager may identify disparities between players, such as based on one or more of the above factors, and correct for such disparities in various ways. Correcting for a disparity may include modifying or otherwise adjusting the length of the course and/or the course location of one or more of the players. For example, the location of a disadvantaged player may be modified such that the player appears to be progressing over the course faster than they really are. Similarly, the location of an advantaged player may be modified such that the player appears to be progressing slower than they really are. As a further example, the competition manager may cause a stronger player to travel over a course that is 10% (or some other amount based on the respective player strengths) longer than other players, and further cause the client devices to vary the display scale, such that all players appear to be traveling on the same length course both to themselves and the other players. Other methods for adjusting, modifying, normalizing, and/or handicapping players or courses may be used. Example techniques for disparity correction are described below with reference to FIGS. 1C and 2D.

In other cases, the competition manager 102 aggregates sporting activities that are of a similar or same type (e.g., paddling/rowing boats of a similar class, running on a standard-distance track, bicycling over one of several pre-designated courses), in which players are self selected into categories or groups of similar experience (e.g., beginner, old-timer), age (e.g., 20 to 30-year olds, 30 to 40-year olds), and/or skill level (e.g., casual, advanced, expert), and in which differences between course conditions are negligible (e.g. a typical player competing over each of the different courses would finish each course in a time that varies by no more than 5%). In such cases, the competition manager 102 need not perform any handicapping, disparity correction, or the like.

In another embodiment, the competition manager 102 also transmits a media content stream to each of the client devices 104a-104c. In particular, the competition manager 102 receives media content, such as text, images, audio, video, and the like, from the media provider 118, and transmits such media content to each of the client devices 104a-104c. The media content may include content that is in some way related to one or more of the players and/or the sporting event itself. For example, real-time and/or historical commentary about the performance of each of the players may be streamed to the client devices 104a-104c in order to enhance the competitive experience for the players. Other types of media content and/or media-related services or functions are contemplated and are discussed further below.

In some embodiments, the competition manager 102 also provides, possibly in cooperation with the media provider 118, an online distributed sporting event media framework. Such a framework provides an environment through which players, spectators, coaches, and other types of users may access media content and other event information, including image data, audio data, video data, conditions information, commentary, text messages, and the like. In one embodiment, the competition manager 102 receives, in substantially or near real time with the movements of the players, video data taken from the locations of the corresponding players (e.g., via helmet cameras, boat cameras), and transmits at least some of the received data via or across the distributed sporting event framework to other players and/or non-participating parties, such as spectators. In some embodiments, the competition manager 102 edits the received video data into a program that presents the progress of the distributed sporting event, by incorporating various views of the event taken from the current locations of some of the players.

In other embodiments, a distributed sporting event framework may provide other and/or additional services. For example, the framework may facilitate real time coaching by persons who are remotely located from the plurality of players; record information about the distributed sporting event, including event times, rankings, scores, and the like; distribute information about upcoming events (e.g., to announce a new race or race series); and facilitate the organization of players into leagues or other groups of players. Organizing players into groups may include facilitating the self selection of players into groups of similar players and/or activities, such as players of similar age, ability, experience, boat type, or the like. In addition, the distributed sporting event framework may facilitate communication amongst player before, during, and after a distributed sporting event, for example by facilitating the exchange of text or other messages between players.

FIG. 2B is a block diagram illustrating functional components of a competition manager 102 and a client device 104 according to one example embodiment of a distributed sporting event facilitator system 100.

The illustrated competition manager 102 includes a participant tracker 202, an event manager 204, and a competition bookkeeper 206. The competition bookkeeper 206 manages information about distributed sporting events and players and/or users of the distributed sporting event facilitator system 100. The functions of the bookkeeper 206 are typically focused on pre-event and post-event operations. Pre-event operations include managing the creation of new distributed sporting events and managing user accounts associated with players. For example, a prospective player can interact with the competition bookkeeper 206 in order to create a new user account. Once that account has been created, the player can create a new distributed sporting event, by providing details such as information about the event course (e.g., dimensions, length, course type, waypoints), the timing of the event (e.g., when the event is to take place), the type of event, or the like. Post-event operations include storing information about event results (e.g., the respective positions/places of the players in an event), providing information about past events (e.g., providing standings), and the like.

The event manager 204 and the participant tracker 202 cooperate to facilitate a particular distributed sporting event. More specifically, the participant tracker 202 receives and records state information from the client device 104. In this manner, the participant tracker 202 tracks the progress of the players that are competing in the distributed sporting event.

The event manager 204 manages a model of the distributed sporting event by updating the model based on the state information received by the participant tracker 202. The event manager 204 also asserts the course by transmitting specific instructions to the client device 104 that, when followed by the corresponding player, would cause or facilitate the player to travel over a specified course. In addition, the event manager 204 transmits information about the updated event model to the client device 104, such as by transmitting to the client device 104 indications of the location of the players competing in the distributed sporting event. Furthermore, the event manager 204 may transmit, or initiate the transmission of, media content to the client device 104. As noted above, media content including live or recorded commentary and/or other information may be streamed or otherwise transmitted to the client device 104 to enhance the competitive experience of the player.

The client device 104 includes a user interface manager 212, an event client 214, and a state information collector 216. The state information collector 216 determines and records state information about the client device 104 and/or a corresponding player. The state information may be received from various sources, including the location information provider 106 (e.g., one or more satellites, one or more cellular telephone towers), sensors that are local to the client device 104 (e.g., an accelerometer, an altimeter, a thermometer), and other remote information sources (e.g., network-accessible weather information). The state information may include location information about the client device 104, such as location, orientation, direction of travel, velocity, acceleration, altitude, and the like. The state information may also include local event conditions information, such as weather conditions (e.g., temperature, precipitation, wind speed, wind direction), course conditions (e.g., road or trail surface conditions, road or trail incline), and the like. In addition, the state information may include information about the player, including biometrics (e.g., heart rate, blood pressure, cadence, blood oxygen level).

The event client 214 facilitates interaction with the competition manager 102. In particular, the event client 214 obtains state information collected by the state information collector 216 and transmits that information to the competition manager 102. Various transmission protocols are contemplated. For example, in some embodiments, a "push" communication model is employed, wherein the event client 214 asynchronously transmits state information to the competition manager 102. In other embodiments, a "pull" communication model is employed, wherein the event client 214 synchronously, in response to a received request, transmits state information to the competition manager 102. In general, the event client 214 may be configured to transmit state information in response to the occurrence of one or more events, such as a passage of time, a change in location, a received request, and the like.

The event client 214 also obtains and records state information about other client devices and/or players. In particular, the event client 214 receives from the competition manager 102 indications of the locations of other players that are participating in the distributed sporting event. The received information is stored for use by the user interface manager 212, described next.

The user interface manager 212 manages the input/output functionality of the client device 104. In particular, the user interface manager 212 presents, on a display (e.g., bit mapped graphics display) of the client device 104, information about the distributed sporting event. The displayed information can include indications of the locations of players participating in the event, a depiction of the event course (e.g., a map), ranking information (e.g., the race positions of the players), instructions (e.g., to make a turn), and the like. The user interface manager 212 updates the displayed information from time to time, such as when the event client 214 receives updated information about the locations of the players or upon the occurrence of other conditions (e.g., a passage of time, a received request). The user interface manager may also present media content, such as commentary or other information, upon the display device.

The above description of the elements of the distributed sporting event facilitator system 100, such as the competition manager 102 and client device 104, is intended as a broad, non-limiting overview to assist the reader's understanding. In particular, FIGS. 2A and 2B illustrate just one example of a distributed sporting event facilitator system 100. The various embodiments discussed herein are not limited to the illustrated arrangements. In particular, distributed sporting event facilitator system 100 and the various elements thereof may contain other components, modules, devices, systems and/or media not specifically described herein, and/or be combined into different units, or the like.

Figure 2C:
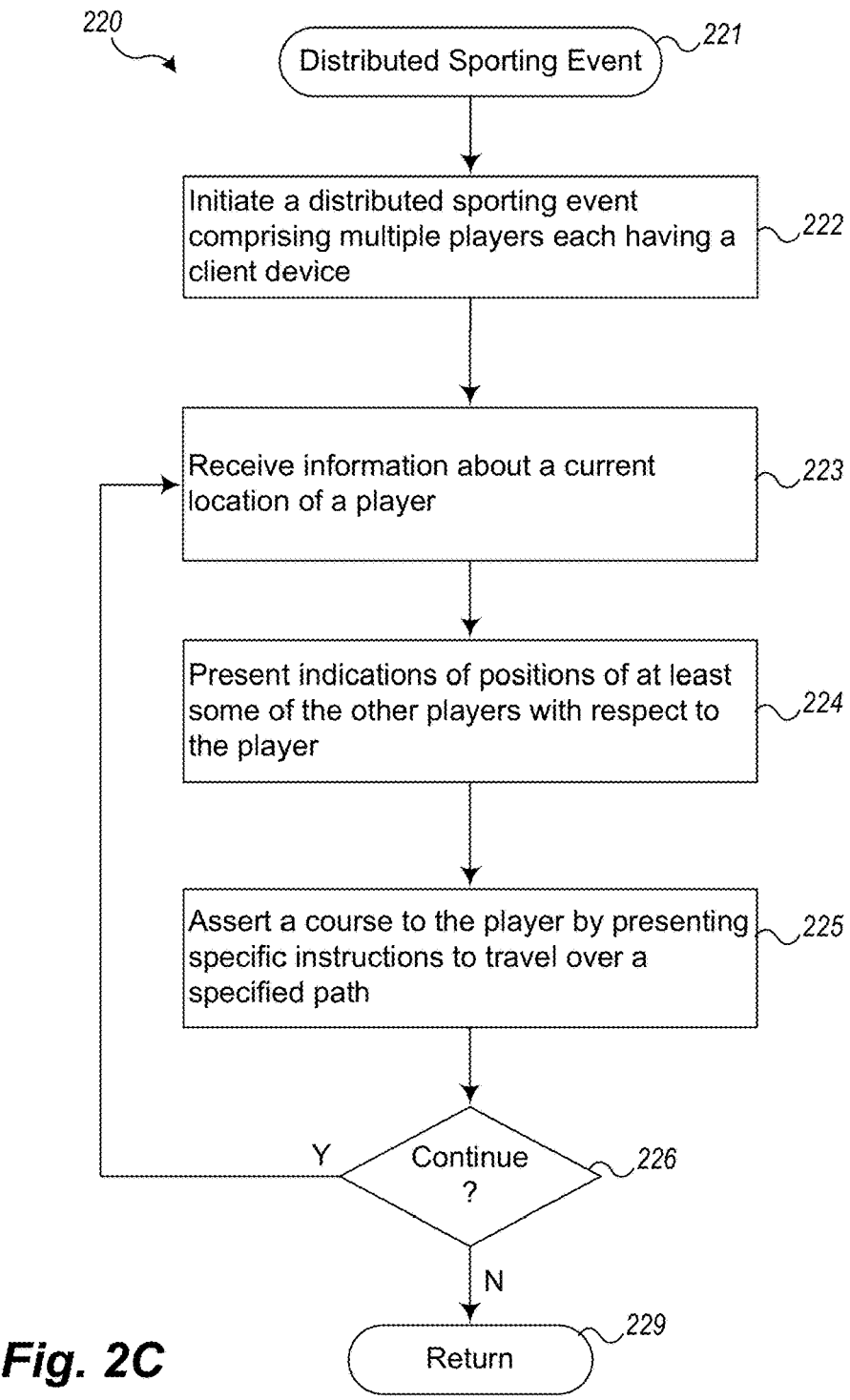
FIG. 2C is an example flow diagram of a distributed sporting event process performed according to an example embodiment.

FIG. 2C is an example flow diagram of a distributed sporting event process performed according to an example embodiment. In particular, FIG. 2C illustrates a process 220 that may be implemented by, for example, one or more elements of the distributed sporting event system 100 as described with respect to FIG. 2B, including the competition manager 102 and/or the client device 104. The process 220 facilitates a distributed sporting event comprising a plurality of players. In one embodiment, the players are each competing against one another by traveling over a course situated at a location that is remote from other of the plurality of players, such as by competing upon different lakes, or different portions of the same lake. In another embodiment, at least some of the players may be competing at the same location, such as by competing over the same course on the same lake.

The illustrated process 220 begins at block 221. At block 222, the process initiates a distributed sporting event comprising multiple players each having a client device. Initiating a distributed sporting event includes notifying one or more players that the event is beginning.

At block 223, the process receives information about a current location of a player. Receiving information about a current location of a player includes receiving the information from a GPS receiver or other location provider associated with a client device.

At block 224, the process presents indications of positions of at least some of the other players with respect to the player. Presenting indications of positions of at least some of the players may include presenting a virtual overlay of the locations of each of the players with respect to one another and/or with respect to the course and/or its boundaries, so that the players appear to be competing over the same course at the same location.

At block 225, the process asserts a course to the player by presenting specific instructions to travel over a specified path. Asserting the course includes presenting specific instructions to travel over a specified path and/or to travel in a specified direction. A path may include a bounded route over which a player must travel in order to compete in manner that complies with the rules of the event. In some embodiments, the bounded route is at continuous or nearly continuous in nature, in that the player is considered to be in compliance with event rules if he is situated within course boundaries all or most (e.g., 80%, 90%) of the time. In some embodiments, the bounded route is mostly continuous in nature, in that the player is considered to be in compliance with event rules if he is situated within course boundaries during the balance (e.g., at least half the time) of the competition. Asserting the course may include determining whether the player is within boundaries of the asserted course path, and if not (or if approaching a boundary) providing visual and/or auditory feedback, instructions, warning, penalties, disqualifications, or the like, that cause the player to re-enter (or stay within) the boundaries.

At block 226, the process determines whether to continue, and if so, continues to block 223, otherwise proceeds to 229, where it returns.

Figure 2D:
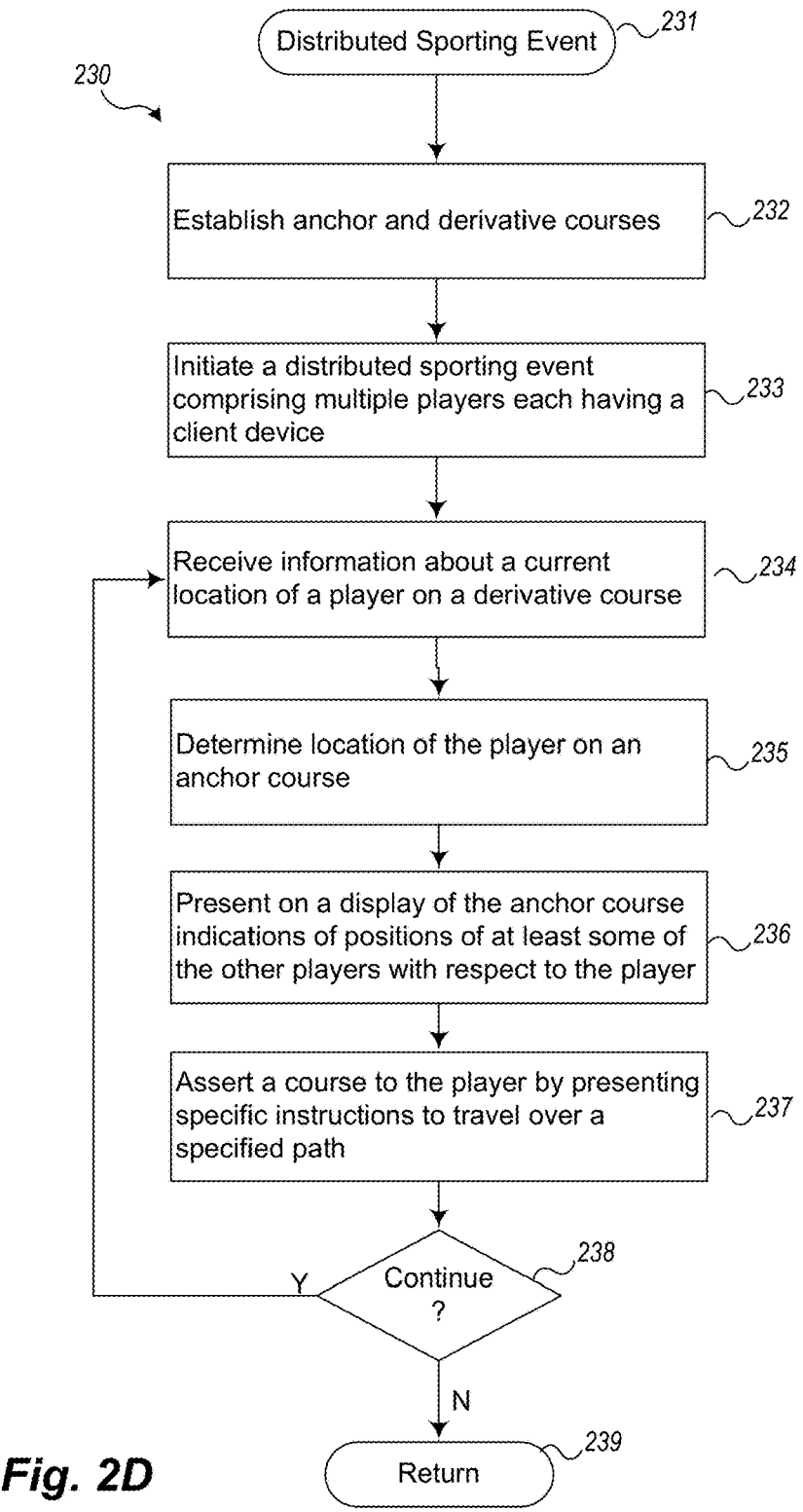
FIG. 2D is an example flow diagram of a distributed sporting event process performed according to an example embodiment that corrects for disparities between non-uniform courses.

FIG. 2D is an example flow diagram of a distributed sporting event process performed according to an example embodiment that corrects disparities between non-uniform courses. FIG. 2D is described in detail below, within the discussion of parity correction of Section C.

Figure 2E:
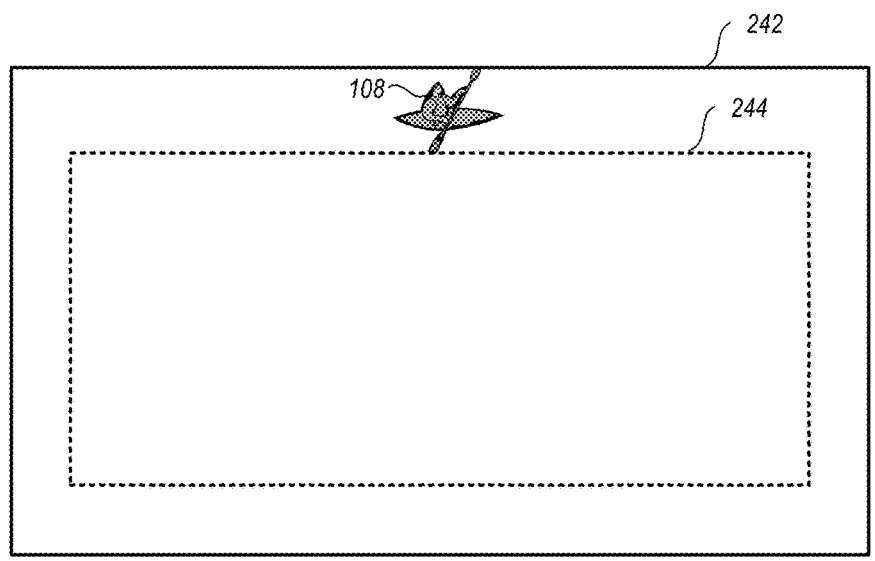
FIGS. 2E-2F illustrate example techniques for determining whether a player is within a boundary of a course.
Figure 2F:
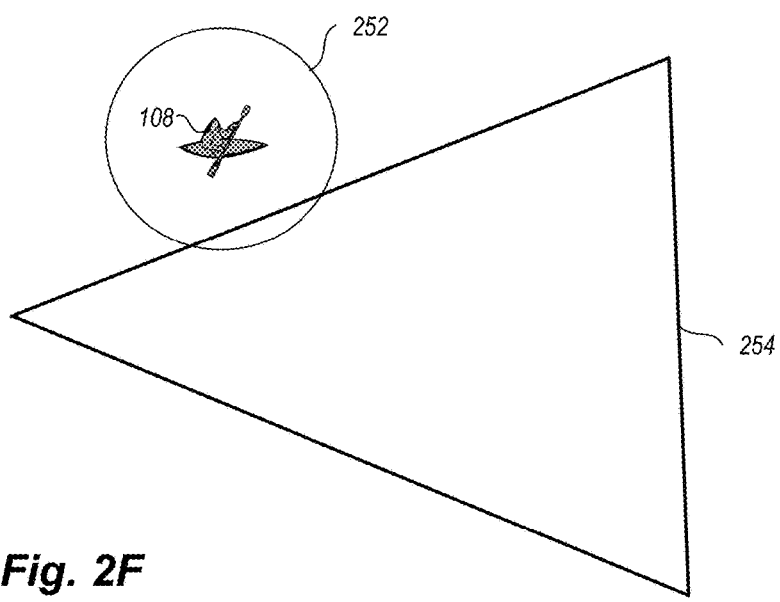

FIGS. 2E-2F illustrate example techniques for determining whether a player is within a boundary of a course. As noted, asserting a course may include determining whether a player is within a boundary of the asserted course. In the example of FIG. 2E, a course is represented as an outer bounding polygon 242 and an inner bounding polygon 244. Here, both polygons 242 and 244 are rectangular in shape, but other shapes may be used, including non-polygonal shapes such as circles, ellipses, arcs and/or aggregations thereof. A player 108 is determined to be within the boundaries of the course when his location (e.g., measured as the location of his client device 104) is outside (or not inside) the inner bounding polygon 244 and inside (or not outside) the outer bounding polygon 242. As the player 108 nears one or the other of the inner 244 or outer 242 bounding polygons, various actions may be taken (e.g., by the competition manager 102), including transmitting an instruction to travel in a different direction and/or to turn the boat, transmitting a warning, causing a client device 104 to present a visual and/or auditory alarm, or the like. Note that the boundaries of the illustrated course are continuous, in that the player 108 must stay within the boundaries at all times during the event.

In the example of FIG. 2F, a course is represented as a polygon 254. A player 108 is determined to be within the boundaries of the course when his location is within a specified distance, here represented as circle 252 having the player 108 placed substantially at or near its center, of any side of the polygon 254 (or other portion of other type of shape used to represent the course). Shapes other than circle 252 are contemplated, including bounding boxes or other polygons. As discussed with reference to FIG. 2E, various actions may be taken to assert the course as the player 108 nears a course boundary. Here, for example, as the distance between the player and the course boundary increases, the competition manager 102 may cause a client device 104 of the player to play a sound of increasing volume and/or pitch, provide specific instructions as to which way to turn the boat, or the like.

Note that in at least some embodiments one or more of the functions attributed to the competition manager 102 may be instead or in part performed by a client device. In one embodiment, the client device determines whether a player is within boundaries of a course, and in response, provides instructions to the corresponding player to travel in a particular direction to stay within the boundaries. In such an embodiment, the client device receives from the competition manager 102 a representation of the course (e.g., at or prior to the beginning of the event), such that the client device can make the necessary determinations locally. The client device may still from time to time transmit location information to the competition manager 102, such that the location information can be forwarded to other client devices for purposes of presenting a virtual overlay of player positions.

Also, although certain terms are used primarily herein, other terms could be used interchangeably to yield equivalent embodiments and examples. For example, it is well-known that equivalent terms in location-based services, distributed processing, and in other similar fields could be substituted for such terms as "client device," "location provider," and the like. Specifically, the term "client device" can be used interchangeably with "portable device," "mobile client," "mobile device," "participant device," and the like. Likewise, the term "location provider" can be used interchangeably with the terms "positioning system", "positioning service," and the like. In addition, terms may have alternate spellings which may or may not be explicitly mentioned, and all such variations of terms are intended to be included.

Example embodiments described herein provide applications, tools, data structures and other support to implement a distributed sporting event facilitator system. Other embodiments of the described techniques may be used for other purposes or contexts, such as for distributed, real-time, location-aware applications generally. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and functions described are not limited by the particular order, selection, or decomposition of steps described with reference to any particular module, component, or routine.

C. Disparity Correction in Example Embodiments

FIG. 1C illustrates example anchor and derivative courses according to an example embodiment that corrects disparities between non-uniform courses. As noted, some embodiments correct for disparities between courses, players, equipment, conditions experienced by players, or the like. In the following, example techniques are described for correcting for disparities between different courses in the road bicycling context. The described approach addresses observed differences in performance due to terrain, weather (e.g., prevailing winds), elevation, and other differences. Non-uniform courses are any courses that differ from one another in at least one way that will impact the performance of the players, including course length, course profile (e.g., the number and/or steepness of any hills on the course, elevation changes), course shape (e.g., number and/or tightness of curves and/or corners, length of straight-aways), prevailing environmental conditions (e.g., prevailing or current wind, temperature), and the like. This variant employs a distinctly different approach from the other approaches described herein, where the courses are assumed to be substantially similar (e.g., current-free flat-water boat racing, one-quarter mile running track). At least some of these techniques may be applied in other contexts, including mountain biking, running (e.g., around a track, on a road course, cross country, trail), cross country skiing, motor racing (e.g., rally racing), boating, or the like.

Some embodiments that perform disparity correction employ an "anchor" technique to a first course, also known as an "anchor course." Counterpart courses, known as "derivative courses," may be established in other parts of the same city as the anchor course, or in other cities (e.g., within the US or internationally). The anchor course may be established anywhere, although for purposes of explanation, the approach described below assumes that the anchor course is established in Seattle.

In the described embodiment, the Seattle anchor course, which will be used to establish standard times, is exactly 40 km in length, which is roughly 25 miles. derivative courses may be established in any number of other cities, such as San Francisco, Los Angeles, Chicago, Boston, Denver, and the like. A given city may have more than one derivative course. The courses (anchor and derivative) are preferably substantially free of man-placed traffic hindrances, such as traffic lights, stop signs, pedestrian crossings, or areas of likely areas of congestion.

The example Seattle anchor course is marked or divided into 1/10 km increments. Then, five elite (e.g., Category 1 or 2) reference cyclists ride the Seattle anchor course individually. Other embodiments may use a different number of cyclists, although it is preferable to use more than two or three, so that meaningful standard times can be established. Each rider rides in a time trial format, meaning that the rider does not ride with the benefit of other riders (e.g., no drafting or pack riding) and does not attack or otherwise sprint. The rider rides with an overall goal of establishing his best time for the course. Specific times (in ss.tt format) are then taken and electronically recorded at every 1/10 km ($D_x$). These times may be recorded via a tracking device carried by the cyclist or his bicycle or by other mechanisms, such as via an associated pacing car. These times are recorded with to the hundredth of a second (ss.tt). Note that these times are fixed-distance based. The recorded times are known as "anchor times" ($T_x$), for each of the elite reference cyclists. Since the anchor course is exactly 40 km in length, and time data is collected every 1/10 km, there are 400 data points for each cyclist—Cyclist1 ($T_1$-$T_{400}$).

Once data points have been collected for each of the five cyclists has ridden the course, an average time for the five cyclists is calculated. Table 1, below, includes example data for the first two course increments.

TABLE 1

| Increment | Cyclist1 | Cyclist2 | Cyclist3 | Cyclist4 | Cyclist5 | Ave. |
|---|---|---|---|---|---|---|
| T1 (0.1 km) | 10.26 s | 11.18 s | 10.44 s | 11.12 s | 11.02 s | 10.80 s |
| T2 (0.2 km) | 21.12 s | 23.14 s | 22.80 s | 22.56 s | 21.66 s | 22.26 s |
| ... | | | | | | |
| T400 (40.0 km) | | | | | | |

In this embodiment, 400 data points of this nature are recorded, and designated as "Average anchor course Times, or avg($T_x$). This set of data serves as anchor time-based data, and forms the basis for constructing other derivative courses. Note that the purpose of establishing an anchor course is primarily to collect these 400 data points. This same Seattle course may eventually be re-asserted as a simple instance of another derivative course, which does not vary from its instance as an anchor course.

Derivative courses are established based on the 400 specific time data points as collected by the anchor course time collection operations described above. Once a given derivative course is established, no deviations from that course are allowed. This constraint is necessary to ensure mathematical parity as compared to cyclists' performance on other derivative courses. Only a given-set of established derivative courses may be used for purposes of a distributed sporting event competition.

Establishment of a derivative course will typically require a course minimally 45 km in length (given a 40 km anchor course). It is quite likely that not all of the 45 km will become part of the established derivative course, but the additional length is used in case the derivative course has considerably easier conditions (e.g., less hilly) than the anchor course.

In this embodiment, at least two elite (e.g., Category 1 or 2) reference cyclists along with a pacing car having precision timing and distance measurement equipment are utilized. The pacing car precisely measures distance, from the starting point of the derivative course. Distances are measured in km·mm. Each of the cyclists will ride the course individually. The pacing car records distance travelled from the course at each of the 400 avg($T_x$) data points. Thus a given derivative course, 800 distance data points will be collected, 400 for each cyclist.

Each of the recorded distances will be represented as City($D_x$). So, for purposes of example, data recordings may be represented as follows:

Cyclist1 Washington($D_6$)=0.64 km
Cyclist2 Washington($D_6$)=0.58 km
Cyclist1 Denver($D_{300}$)=23.70 km
Cyclist2 Denver($D_{300}$)=24.08 km Note that derivative courses that are more challenging, perhaps due to wind and/or terrain, will generally have lower distance recordings, as in the lower Denver examples above.

A two-cyclist average is then computed for each of the derivative course distances. These data points will following the following representation:

avg(Washington($D_6$))=0.61 km
avg(Denver($D_{300}$))=23.89 km

Other embodiments may not utilize a pace car. For example, instead of a pacing car, a tracking device may be attached to or otherwise carried by the cyclist or his bicycle. At each of the 400 times recorded for the anchor course, the tracking device will record a corresponding distance and/or other location information (e.g., GPS coordinate).

Once all of the derivative course distance data points have been collected, GPS coordinates will be mapped (geo-coded) to each of the locations that represent the averages computed above. For example, the point avg(Washington($D_6$))=0.61 km may be mapped to the absolute latitude/longitude coordinates 39.1434, −77.2013, while the point avg(Denver($D_{300}$))=23.89 km may be mapped to the coordinates 39.7375, −104.9847.

Turning now to the specifics of FIG. 1C, which depicts an anchor course 1001 and a derivative course 1003 according to an example embodiment. The anchor course 1001 in this example is located in Seattle. The anchor course 1001 is overlaid with six example increments 1002a-1002f (also called "locations," or "time checks"). Increment 1002a is located at the beginning of the course (0.0 km and 0.0 seconds). Increments 1002b-1002d are the next three increments, respectively located at 0.1, 0.2, and 0.3 km from the beginning. Increments 1002e and 1002f are situated on a later portion of the course, respectively located 14.1 and 14.2 km from the beginning. As discussed above, as the baseline cyclists ride the course 1001, their times are recorded at each increment. FIG. 1C and Table 2, below, show the average times for anchor course 1001.

The derivative course 1003 in this example is located in Denver. The derivative course 1003 is overlaid with six example time increments 1004a-1004f (also called "locations" or "distance checks"). Increment 1004a is located at the beginning of the course (0.0 seconds and 0.0 km). Increments 1004b-1004d are the next three increments, respectively located at 10.8, 22.26, and 31.52 seconds from the beginning. Increments 1004e and 1004f are situated on a later portion of the course, respectively located 1311.23 and 1321.04 seconds from the beginning. As discussed above, as the derivative course cyclists ride the course 1003, their distances are recorded at each time increment, where the time increment is determined based on the corresponding time from the anchor course 1001. FIG. 1C and Table 2, below, show the average distances for the derivative course 1003.

TABLE 2

| Anchor Course (e.g., Seattle) | | Derivative Course (e.g., Denver) | |
| --- | --- | --- | --- |
| Time check (km) | Avg. Time (sec) | Dist. Check (sec) | Avg. dist (km) |
| $T_1 = 0.1$ | 10.80 | 10.80 | 0.09 |
| $T_2 = 0.2$ | 22.26 | 22.26 | 0.19 |
| $T_3 = 0.3$ | 31.52 | 31.52 | 0.27 |
| ... | ... | ... | ... |
| $T_{141} = 14.1$ | 1311.23 | 1311.23 | 13.51 |
| $T_{142} = 14.2$ | 1321.04 | 1321.04 | 13.62 |
| ... | ... | ... | ... |
| T400 = ... | | | |

As discussed above, once the required data has been collected, the locations 1004a-1004f can be mapped to particular locations, for example, specified via GPS latitude/longitude coordinates. These locations can then be used to draw correspondences between players competing over different courses.

Once a derivative course has been established, a player may compete in a distributed sporting event using the derivative course in the following manner. In this example, players may compete over distinct derivative courses while using client devices 104. The client device 104 of each player will display the position of the player as if the player is competing head-to-head on the same course. Each time the player passes through a derivative course $D_x$ location (e.g., location 1004d on course 1003), the player's client device 104 will transmit a message to the competition manager 102, the message including the player's location ($D_x$) and time. The competition manager 102 will share this information with other client devices 104. By a similar process, the player's client device 104 will obtain (from the completion manager 102) the locations and times of other players. The player's client device 104 will then map the player's current course location to a corresponding location on a displayed course (e.g., the anchor course 1001). By normalizing all entrant positions to corresponding locations on the anchor course, entrant devices can show the entrants as if they were all racing on a uniform course.

In an example race, participant A is racing on the anchor (Seattle) course 1001 and participant B is racing on the derivative (Denver) course 1003. When participant B crosses location D141 (at 13.51 km) on the Denver course 1003, participant B will be shown on client devices as if he has traveled 14.1 km on the anchor course (which is the displayed course). If at that same moment participant A has traveled 14.1 km over the Seattle course 1001, participant A will be shown on client devices at 14.1 on a display of the Seattle course. Participant A and B will thus appear as if they are substantially tied, even though participant B has actually traveled a shorter distance (albeit over a more difficult course). Note that any course can be selected for display purposes, because locations from one course may be mapped to locations on other courses.

Note that location information may be reported in different ways or at different times in other embodiments. For example, the client device 104 may periodically (e.g., every five seconds) determine a current location. This current location may then be mapped to the nearest $D_x$ location for purposes of translating the location to the anchor course. In other embodiments, the player's location may be represented as the nearest $D_x$ location and a vector, distance, or time that represents the current offset from the $D_x$ location. For example, a location may be represented as a the pair ($D_{141}$, 3.5 sec), representing the fact that location D141 was passed 3.5 seconds ago. This information may be used to more precisely map a player's location to a position on the anchor (or some other) course.

Note that this approach does not provide for instantaneous time/location information. Data is correct as of the most recent Dx course milestone. In general, for competitive cyclists, 0.1 km is roughly covered in 9 seconds. Thus, displayed information will have an average lag of 4.5 seconds for each competitor. This lag could be reduced by increasing the frequency of data collection points on the anchor course. For example, by doubling the number of increments (e.g., 20 per km rather than 10 per km), the delay will be reduced by half. In addition, the client devices 104 may be configured to estimate the velocity of the various players (e.g., based on the last N position reports), so that the displays may be more frequently updated (e.g., at least 10, 15, or 20 times per second) in order to provide the illusion or appearance of continuous motion across the display screen of the client device 104.

The above-described techniques for disparity correction may be modified in other embodiments. As one example, anchor course increment locations may be determined or selected in different ones. Some embodiments may select increments such that there are more increments during more difficult portions (e.g., uphill) of the course, so that a higher resolution may be obtained over the portions of the course where the reference athletes are typically moving more slowly. Some embodiments may perform the selection of increments in a dynamic manner, for example, based on the speed of the reference athlete (e.g., more increments at slower speeds). Other embodiments may select increments based on a static analysis of the course, so that more increments are located on hilly (e.g., based on topographical data) portions of the course. The distribution of increments on the reference course need not be uniform.

In addition, other embodiments may reverse the time/distance relationships established above. For example, increments on the anchor course may be determined based on time (e.g., every 10 seconds) rather than distance, resulting in distances being recorded every N seconds as the reference athlete travels over the anchor course, and further resulting in times (rather than distances) being recorded for the derivative course. If times are used, translating player locations to course locations may then be performed by mapping elapsed times (rather than distances) to distances on an anchor or a derivative course, and then using the mapped distances for presentation purposes.

In other embodiments, larger or smaller increments may be used. In general, in the bicycling context, increments in the range 0.05 km (50 meters) to 0.2 km (200 meters) may be used. In other sports, different increment sizes may be used. For example, running may use 20 meter increments.

Turning now to FIG. 2D, which shows an example flow diagram of a distributed sporting event process performed according to an example embodiment that corrects disparities between non-uniform courses. In particular, FIG. 2D illustrates a process 230 that may be implemented by, for example, one or more elements of the distributed sporting event system 100 as described with respect to FIG. 2B, including the competition manager 102 and/or the client device 104. The process 230 facilitates a distributed sporting event comprising a plurality of players who are each competing against one another by traveling over non-uniform courses situated at locations that are remote from one another, such as by cycling over different road courses in different cities.

The illustrated process 230 begins at block 231. At block 232, the process establishes anchor and derivative courses. Establishing anchor and derivative courses may include tracking the distance and/or time of reference cyclists as they travel over courses. Establishing courses may also include other operations, including averaging or aggregating times amongst riders, recording times/distances, generating tables or other data structures that represent correspondence between courses, and the like.

At block 233, the process initiates a distributed sporting event comprising multiple players each having a client device. Initiating a distributed sporting event includes notifying one or more players that the event is beginning.

At block 234, the process receives information about a current location of a player on a derivative course. Receiving information about a current location of a player includes receiving the information from a GPS receiver or other location provider associated with a client device. Receiving the information may also or instead include receiving an indication that a particular course increment ($D_x$), possibly along with a time, distance, and/or direction delta, as discussed above.

At block 235, the process determines a location of the player on an anchor course. Determining the location on the anchor course may include mapping, normalizing, or otherwise corresponding the reported position of the player to the anchor course or any other derivative course as discussed above.

At block 236, the process presents indications of positions of at least some of the other players with respect to the player, the indicated positions based on the locations on the anchor course of the least some of the plurality of players. Presenting indications of positions of at least some of the players may include presenting a virtual overlay of the locations of each of the players with respect to one another and/or with respect to the course and/or its boundaries, so that the players appear to be competing over the same course at the same location. As noted, the process may display, for a given player, the player on a depiction of the anchor course, the course he is actually traveling (which may be a derivative course), or some other derivative course.

At block 237, the process asserts a course to the player by presenting specific instructions to travel over a specified path. Asserting the course is discussed in more detail with respect to FIG. 2C, above. In the context of disparity correction in non-uniform courses, the instructions may be different from the depicted course, particularly when the depicted course is different than the course being actually traveled by the player.

At block 238, the process determines whether to continue, and if so, continues to block 234, otherwise proceeds to 239, where it returns.

D. User Interfaces Provided by Various Example Embodiments

Figure 3B:
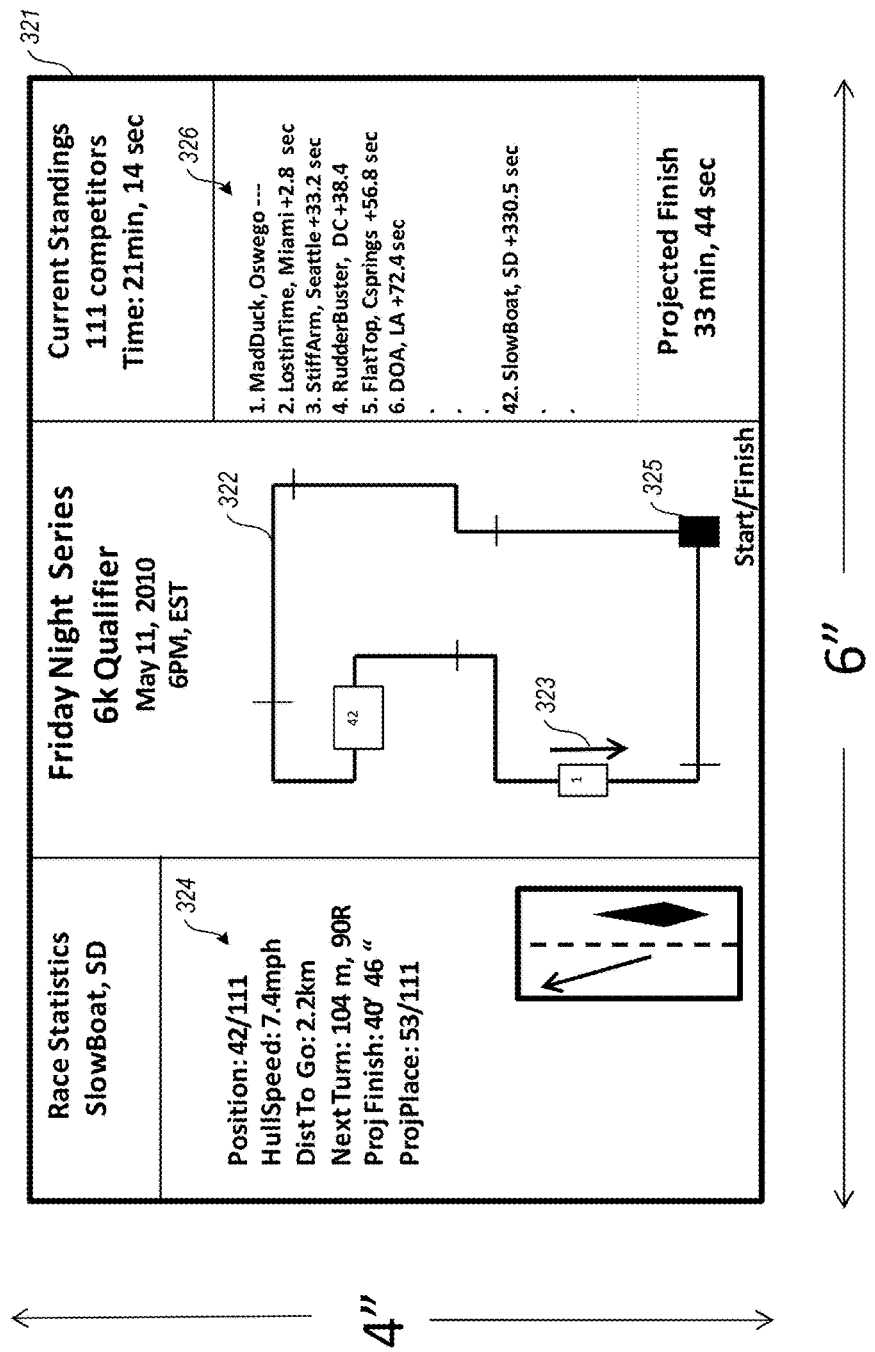
Figure 3C:
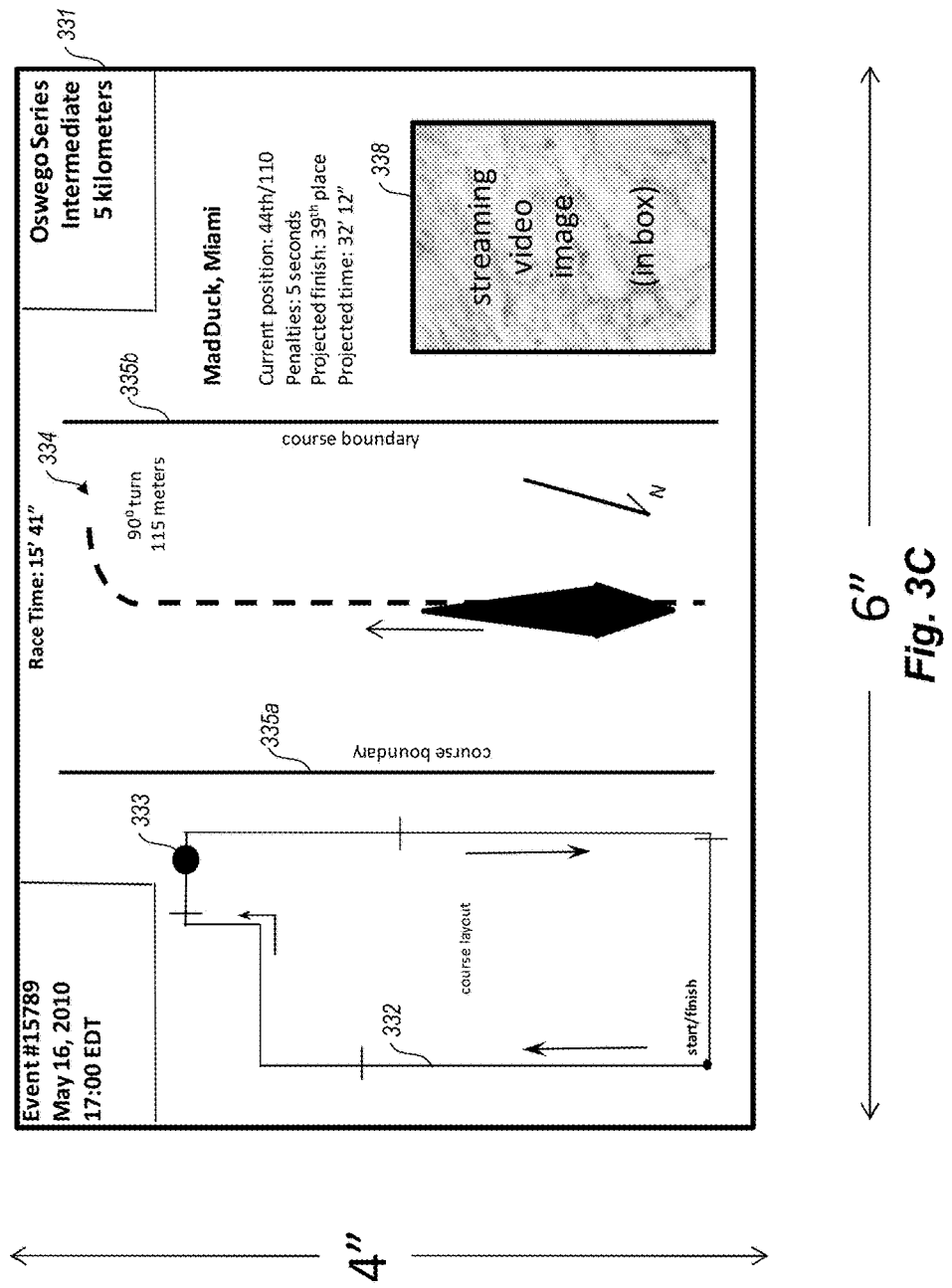
Figure 3D:
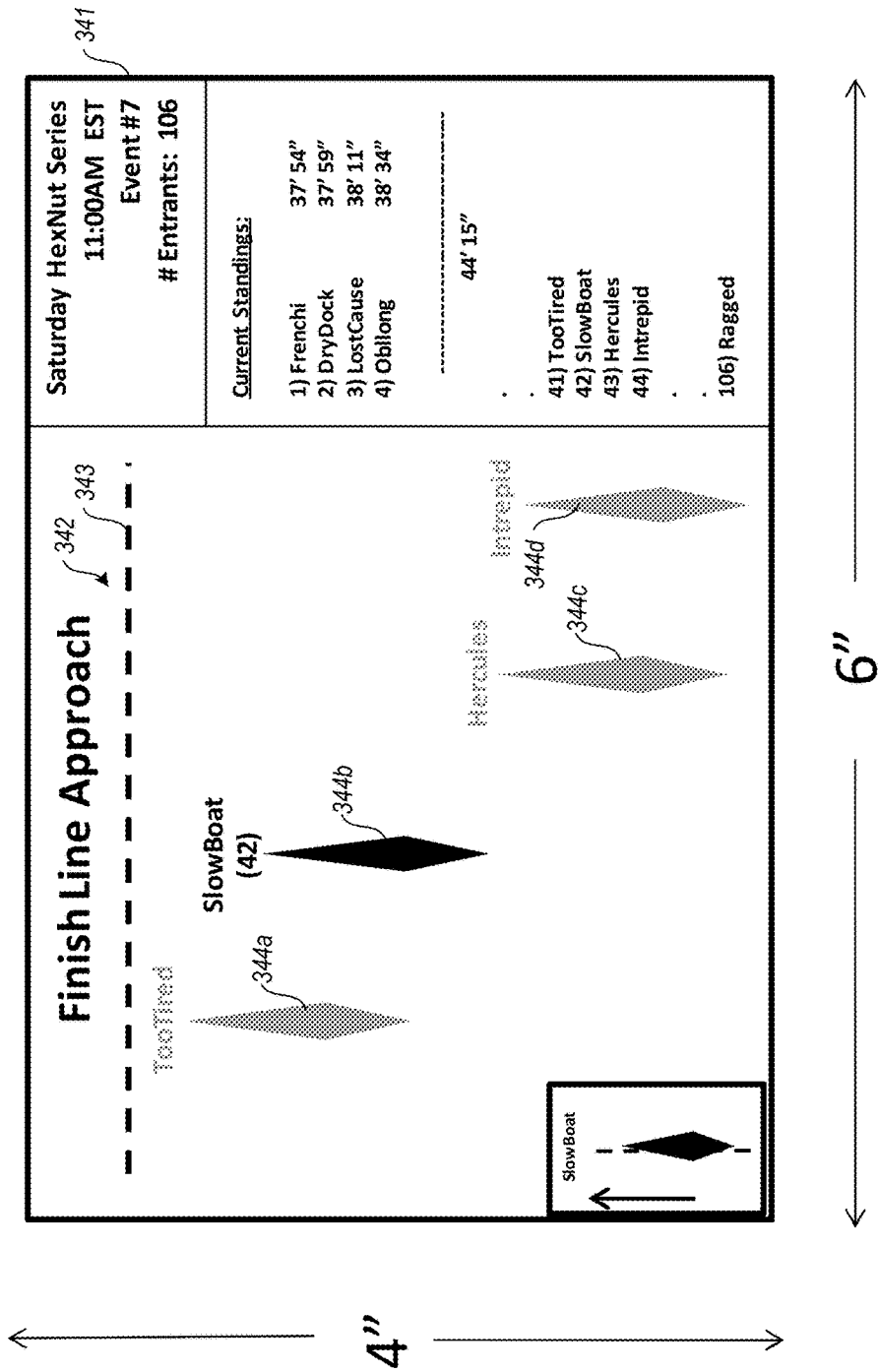
Figure 3E:
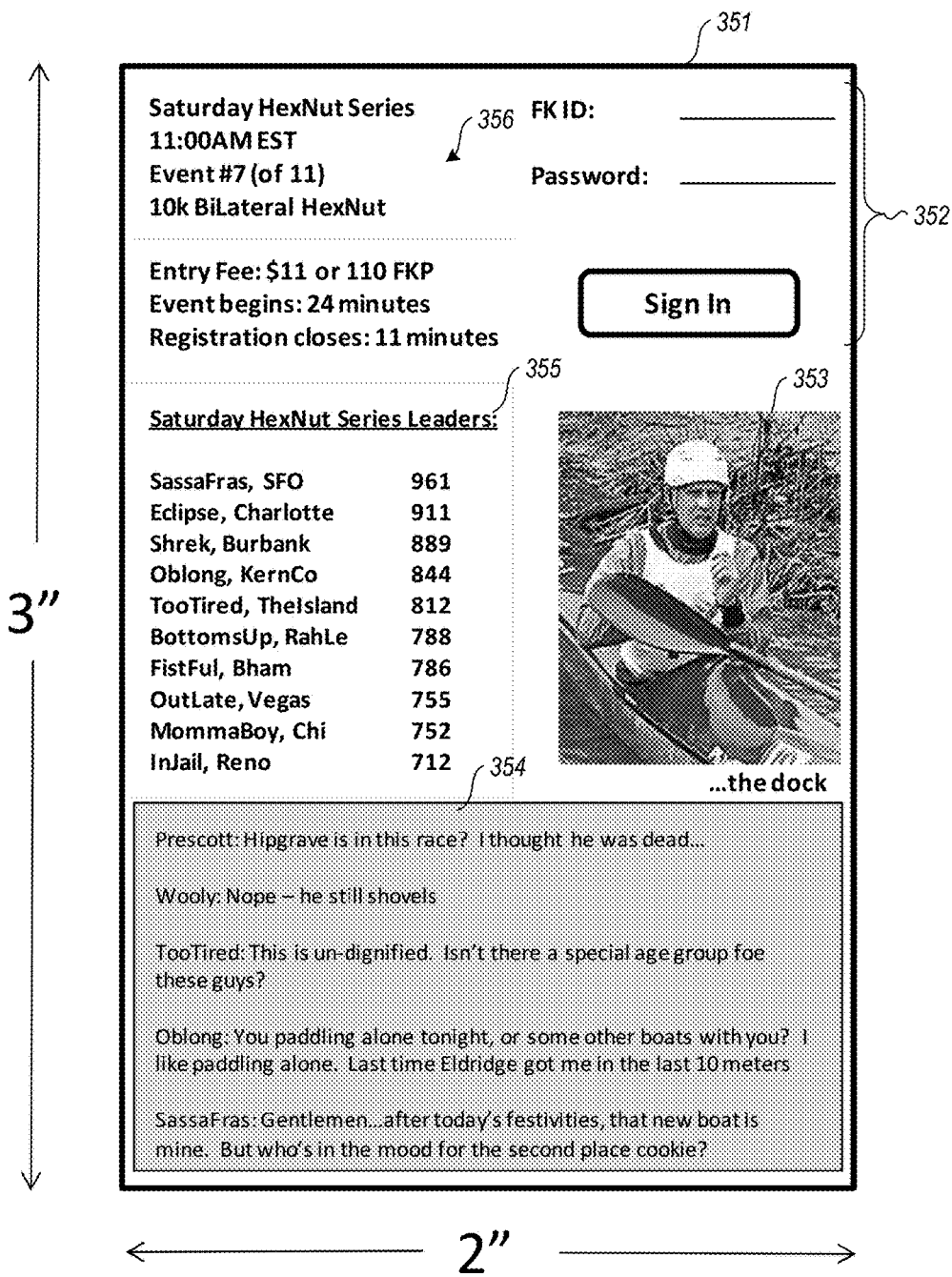
Figure 3F:
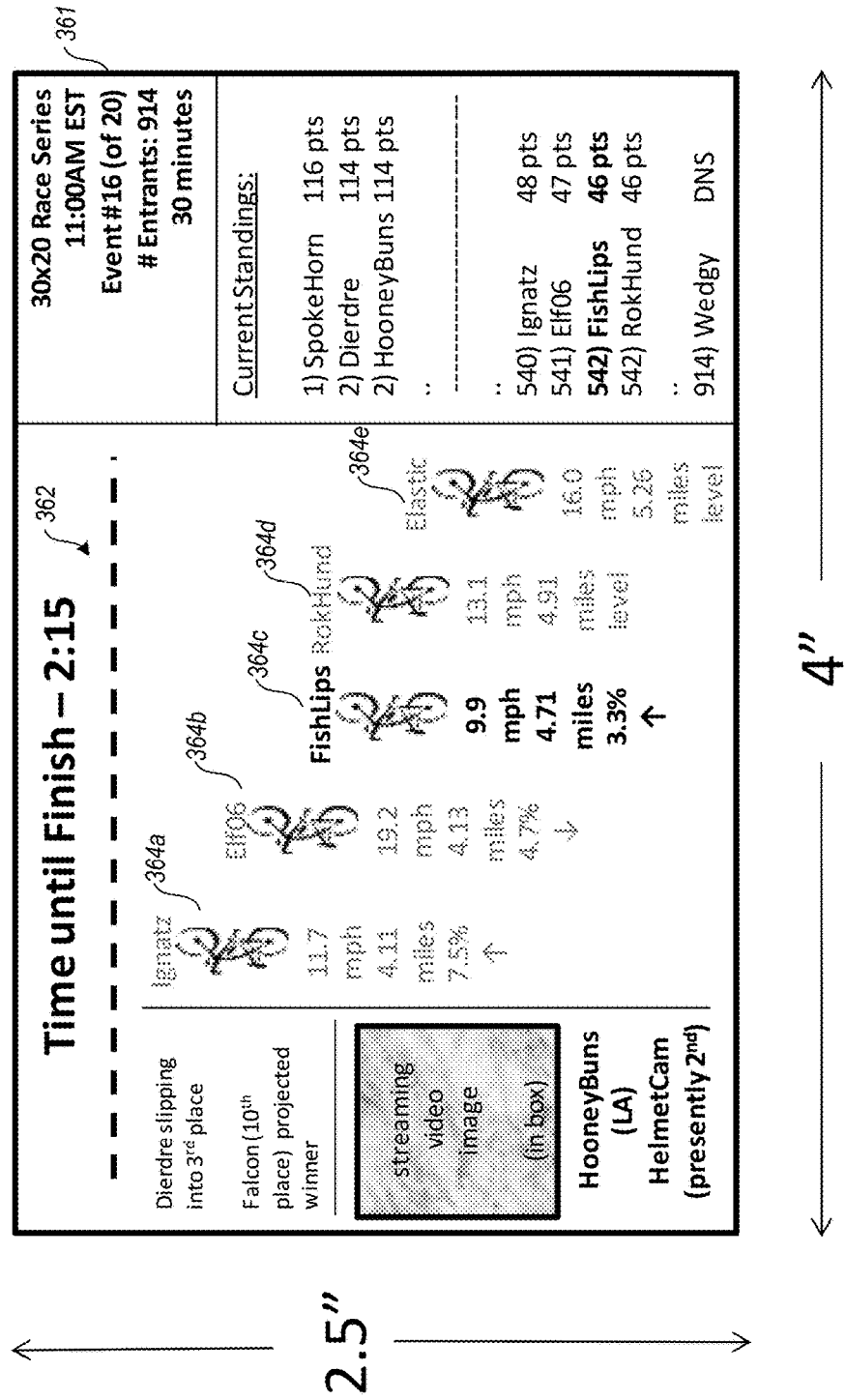

FIGS. 3A-3F are block diagrams illustrating example client device user interface aspects according to various example embodiments. In particular, FIG. 3A shows example user interfaces provided by client devices used in the kayaking example of FIG. 1A. FIGS. 3B-3E show additional views of example user interfaces provided by client devices used in an example kayaking implementation. FIG. 3F shows an example user interface provided by a client device used in a bicycling implementation.

FIG. 3A illustrates user interface screens 301a and 301b respectively displayed upon client devices 104a-104b. In particular, screens 301a and 301b present event information regarding the state of the distributed sporting (kayak race) event described with reference to FIG. 1A.

The screens 301a and 301b present graphical representations of the event course annotated with indicators of the locations of the players. As can be seen in FIG. 1A, player 108a is leading player 108b. This fact is illustrated by, for example, the screen 301a of device 104a used by player 108a, showing a graphical representation, such as a map, 310a of the course annotated with icons 312a and 312b that respectively indicate the locations of players 108a and 108b. Icon 312a is highlighted or otherwise bolded to indicate that icon 312a corresponds to player 108a who is using device 104a and is leading player 108b with corresponding icon 312b. Similarly, screen 301b of device 104b used by player 108b shows a graphical representation 310b of the course annotated with icons 312c and 312d that respectively indicate the locations of players 108a and 108b. In this case, icon 312d is highlighted to indicate that icon 312d corresponds to player 108b who is using device 104b and is trailing player 108a with corresponding icon 312c.

Note that the screens 301a and 301b each display a virtual overlay of the positions of the players with respect to each other and/or the course. Thus, even though the players 108a and 108b are participating at locations that are remote from one another (e.g., on different lakes) they appear to be competing against one another, in a head-to-head fashion, on the same course. Other examples of virtual overlays that make it appear as if players are competing over the same course are shown FIGS. 3B, 3D, 3F, and 10.

The screens 301a and 301b also present other kinds of event information in various other ways. For example, screen 301a includes a graphical representation 316 that indicates that the boat raced by player 108a is tracking slightly to the right of the center line of the course. Also, screen 301a includes a text area 314 which provides textual and/or graphical information about the event, including an identifier of the player (e.g., "Boat #32"), a current race position/ranking (e.g., "1/2" meaning "first position out of a total of two racers"), a current speed (e.g., 7.5 miles per hour), and an event instruction describing an upcoming turn (e.g., "30 m-100R" meaning "in thirty meters, make a 100 degree right turn, the angle of turn measured from the direction of travel").

In some embodiments, event instructions are used to assert the course by providing instructions to the players to assist them in participating in the event. Instructions can be in textual format, such as one that is shown in text area 314, above, where the player is instructed to make a 100 degree right turn in thirty meters, where the angle of the turn is measured from the direction of travel. Instructions can also be in graphical format. For example, arrow 318 instructs the player 108a to turn slightly to the left, in order to correct for the fact that the boat is tracking to the right of the center line of the course.

Other types of event instructions are contemplated, such as those provided to improve the performance of the player. In particular, the client device may display sport-specific instructions, such as a preferred stroke type or rowing cadence for paddle sports, or a preferred pedal cadence or body position (e.g., in or out of saddle) for cycling sports.

The client device may also display target output levels, such as for heart rate, breathing, speed, and the like.

Event instructions may also include warnings or indications of potential or actual infractions of race rules. For example, an event instruction can warn a player that they are about to stray too far from the race course, and are therefore in danger of being disqualified from the race. As another example, an event instruction can warn a player that they are moving too slowly to finish the race within a predetermined time limit, and are therefore in danger of being disqualified. In a further example, an event instruction can inform a player that they have been disqualified or penalized for an infraction of a race rule.

In some embodiments, asserting the course includes the use of alarms, or other visual or auditory feedback that is based on the nearness of a player to a course boundary. For example, a beeping sound may be played at increasing volumes as a player approaches a course boundary. In another embodiment, a visual indicator may flash more brightly or more frequently as the player approaches a course boundary.

In the context of disparity correction for non-uniform courses, the graphical representations 310a and 310b may represent various courses. For example, assuming that players 108a and 108b are respectively competing in Seattle and Denver, the graphical representations 310a and 310b may both represent the same course: Seattle, Denver, or some other city for which a derivative course has been established. Furthermore, the graphical representations 310a and 310b could represent different courses, such as respectively representing Seattle and Denver, or vice versa. The described techniques will map the positions of the players 108a and 108b to any derivative course that has been established according the above-described techniques. In this manner, a player can appear to be competing over a course over which he is not actually racing. Players may be provided the option to select the course for display via the screen 301 or some other mechanism.

Furthermore, in the context of disparity correction for non-uniform courses, the course that is asserted to the player may actually be different than the course that is displayed via one of the graphical representations 310a or 310b. In particular, if a player has selected a display course that differs from the one over which he is racing, he will be provided with event instructions configured to keep him racing over his actual course. Because the courses may not have the same layout (e.g., different shapes, turns), these event instructions may be at odds with or different from the depiction of the player 108a traveling over the graphical representation 310a.

FIG. 3B illustrates another example user interface screen 321 displayed by a client device used in a kayaking implementation. The screen 321 is similar to screens 301a and 301b described with respect to FIG. 3A, except that screen 321 illustrates a number of other types of event information that can be displayed by various embodiments. For example, screen 321 displays a graphical representation 322 of a course that includes a directional indicator 323 and a start/finish indicator 325. Again, when non-uniform courses are being used, the graphical representation 322 may represent the course over which the player is actually traveling or some other derivative course, according the disparity correction techniques described herein. The directional indicator 323 indicates a direction of travel of a corresponding player/boat. Other types of event information are shown in text area 324, including current race position (42nd out of 111), hull speed (7.4 miles per hour), distance to finish (2.2 kilometers), distance to next turn (104 meters) and type of turn (90 degrees right), projected finish time (40 minutes and 46 seconds), and projected finish position/place (53rd out of 111). Additional event information is shown in text area 326, which shows a list of players ordered by position (i.e., a leader board) along with timing information showing a number of seconds behind the leader.

The form factor of screen 321 is approximately 4 inches (about 10 cm) high by 6 inches (about 15 cm) wide. Screen 321 is suitably dimensioned to be part of a client device that is a standard GPS device or a general-purpose (e.g., tablet computer) or special-purpose computing device. The client device that includes screen 321 will typically be waterproof or water resistant, and include a portable, self-contained power source (e.g., battery). In at least some embodiments, the screen 321 will also be touch sensitive, so that a user can provide inputs to control the device.

FIG. 3C illustrates a further user interface screen 331 displayed by a client device used in a kayaking implementation. The screen 331 is similar in form factor to screen 321 described with respect to FIG. 3B, except that screen 331 illustrates a number of other types of event information. In particular, screen 331 includes a media content display area 338 used to display media content received by the client device. In this case, streaming video is being displayed in the area 338. Media content displayed in area 338 may be related to the sporting event, such as commentary describing the relative performances of the various players. In addition, the media content may in some embodiments be received from other players in the distributed sporting event, such as text, audio, and/or video chat or instant messaging. In some embodiments area 338 may be used to provide betting or wagering functionality, such that players can place wagers on the outcome of sporting events. In some embodiments, the media content may be unrelated to the sporting event, such as audio/video programming (e.g., music, talk radio, news, sports, weather, drama, and/or comedy) obtained from television networks, radio stations, Internet sources, or the like.

Screen 331 also includes a graphical representation 332 of a course that includes an icon 333 that indicates the location of the player viewing screen 331. When non-uniform courses are being used, the graphical representation 332 may represent the course over which the player is actually traveling or some other derivative course, according the disparity correction techniques described herein. The graphical representation 332 does not display locations of other players, but in a typical embodiment, this function can be toggled to show some or all of the other players, such as by selecting a user interface control (e.g., a button). Also, in some embodiments, the display of a client device can be switched to present a screen of any of the types shown in FIGS. 3A-3F, or even other types, by pressing appropriate buttons or touch screen areas, or by other input mechanisms, including voice.

Screen 331 also includes a graphical representation 334 that indicates the track of the player's boat as being slightly to the left of the center line of the course, and also instructs the player to make a 90 degree right turn in 115 meters. The graphical representation 334 also includes indicators 335a and 335b indicating the location of the course boundary with respect to the player's boat.

FIG. 3D illustrates a further user interface screen 341 displayed by a client device used in a kayaking implementation. The screen 341 is similar in form factor to screens 321 and 331 described above, except that screen 341 illustrates a number of additional types of event information. In particular, screen 341 includes a graphical representation 342 of a finish line approach. The graphical representation 342 includes a finish line indicator 343 and icons 344a-344d that respectively indicate the locations of four players/boats, named "TooTired," "SlowBoat," "Hercules," and "Intrepid." Icon 344b is highlighted (e.g., bolded) to indicate that it represents the current player's boat. Note that the graphical representation 342 may display player positions in a manner that is only partly faithful to, or otherwise reflective of, the actual physical positions of the players. For example, the left-right positioning of the icons 344a-344d may not reflect the actual left-right positioning of the corresponding players, and instead be selected or determined for display purposes (e.g., to make the display more readable). When non-uniform courses are being used, the depiction in screen 341 may be based on the course over which the player is actually traveling or some other derivative course, according the disparity correction techniques described herein.

FIG. 3E illustrates another user interface screen 351 used in a kayaking implementation. Screen 351 is a smaller form factor than screens 321, 331, and 341 described above. In particular, screen 351 is approximately 3 inches (about 7.5 cm) high and 2 inches (about 5 cm) wide. Screen 351 is suitably dimensioned to be part of a smart phone, personal digital assistant, pocket-sized GPS device, or the like.

Also, in contrast to the in-event information presented by screens 321, 331, and 341, above, screen 351 presents primarily pre-event information, such as may be displayed prior to the beginning of a race. In particular, screen 351 includes a login area 352, a media area 353, a message area 354, a league standings area 355, and an event overview area 356. The event overview area 356 provides information regarding an upcoming race, taking place at 11 AM Eastern Standard Time ("EST"), beginning in 24 minutes, with registration closing in 11 minutes. The upcoming race has an entry fee, payable in dollars ($11) or in points (110 FKP). The login area 352 includes user-selectable controls (e.g., text entry fields, buttons) configured to receive user identifiers, passwords, and similar tokens that may be used to authenticate a player for purposes of registering for the upcoming race. The media area 353 is shown displaying a video or still image of a player. The message area 354 includes instant messaging (e.g., chat) functionality, such that the player can converse via text, audio, and/or video with other players. The league standings area 355 provides information about current league standings, such as accumulated total scores or points based on a series of races.

FIG. 3F illustrates an example user interface screen 361 used in a bicycling implementation. The illustrated user interface screen 361 is about 4 inches (about 10 cm) wide by 2.5 inches (about 6.4 cm) high. The screen 361 is suitably dimensioned to be part of a bicycling computer, GPS unit, or other computing device mounted on a bicycle, such as on the handlebars. The screen 361 includes a graphical representation 362 including five icons 364a-364d respectively representing the relative positions of five cyclists. Each bicycle icon 364a-364d is annotated with text that includes the cyclist's competition name ("Ignatz," "Elf06," "FishLips," "RokHund," and "Elastic," respectively), current speed (11.7, 19.2, 9.9, 13.1, and 16.0 miles per hour, respectively), distance to finish (4.11, 4.13, 4.71, 4.91, and 5.26 miles, respectively), and current grade. The current grade indicates the percent uphill or downhill grade (indicated by an up or down arrow) being currently ridden by a cyclist. For example, the cyclist "Ignatz" is shown riding a 7.5% uphill grade, the cyclist "Elf06" is shown riding a 4.7% downhill grade, and the cyclist "Elastic" is shown riding on substantially or near level ground. When non-uniform courses are being used, the depiction in screen 361 may be based on the course over which the player is actually traveling or some other derivative course, according the disparity correction techniques described herein.

Although various specific user interface aspects have been described above, these aspects may be varied in other embodiments. For example, other form factors and/or layouts may be utilized. In one embodiment, client devices may be suitably dimensioned to be worn on the body, such as on the wrist or forearm. Such a small form factor may be suitable, for example, in a distance running (e.g., trail running, 10K, marathon, ultra marathon) or multi-sport (e.g., triathlon, adventure racing) implementation. In addition, at least some of the above-described user interface features may be deployed using other display media, such as eyeglass displays, heads up displays, or the like.

E. Example Computing System Implementations

Figure 4:
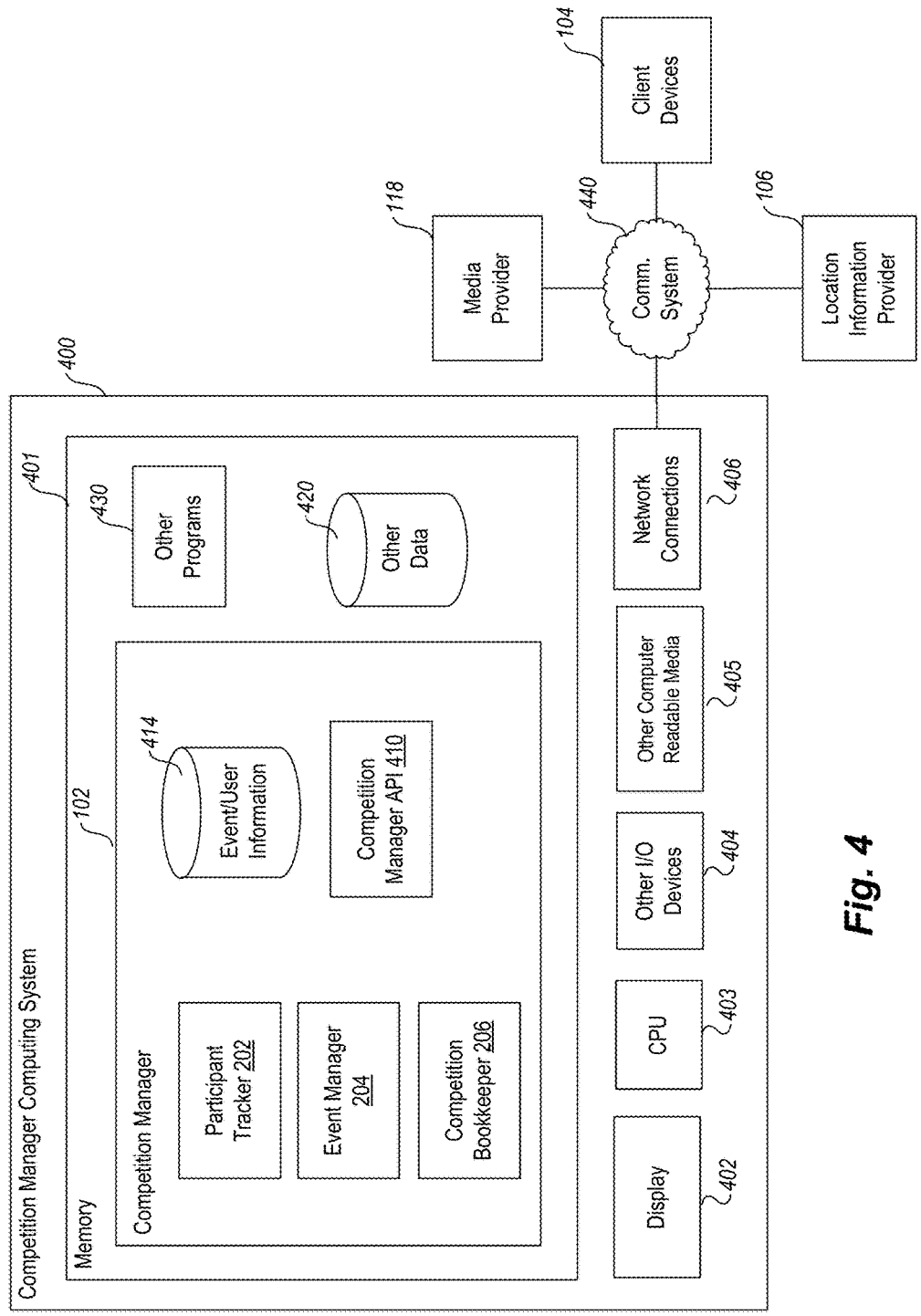
FIG. 4 is a block diagram of an example computing system for implementing an example competition manager according to an example embodiment.

FIG. 4 is a block diagram of an example computing system for implementing an example competition manager according to an example embodiment. FIG. 4 shows a computing system 400 that may be utilized to implement a competition manager (i.e., an event controller) 102. Typically, the computing system 400 is a network accessible server computing system that manages one or more distributed sporting events for multiple participants.

Note that one or more general purpose or special purpose computing systems/devices may be used to implement the competition manager 102. In addition, the computing system 400 may comprise one or more distinct computing systems/devices and may span distributed locations. Furthermore, each block shown may represent one or more such blocks as appropriate to a specific embodiment or may be combined with other blocks. Also, the competition manager 102 may be implemented in software, hardware, firmware, or in some combination to achieve the capabilities described herein.

In the embodiment shown, computing system 400 comprises a computer memory ("memory") 401, a display 402, one or more Central Processing Units ("CPU") 403, Input/Output devices 404 (e.g., keyboard, mouse, CRT or LCD display, and the like), other computer-readable media 405, and network connections 406. The competition manager 102 is shown residing in memory 401. In other embodiments, some portion of the contents, some or all of the components of the competition manager 102 may be stored on and/or transmitted over the other computer-readable media 405. The components of the competition manager 102 preferably execute on one or more CPUs 403 and facilitate distributed sporting events, as described herein. Other code or programs 430 (e.g., an administrative interface, a Web server, and the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer readable media 405 or a display 402.

In a typical embodiment, the competition manager 102 includes a participant tracker 202, an event manager 204, a competition bookkeeper 206, a competition manager application program interface ("API") 410, and a data repository 414 that includes event and/or user information. Operation of the participant tracker 202, event manager 204, and competition bookkeeper 206 are described with respect to FIG. 2B, above.

The data repository 414 is used by the other modules of the competition manager 102 to store and/or communicate information. For example, the participant tracker 202 receives state information from one or more client devices 104, and stores the received state information in the data repository 414. In addition, the event manager 204 updates an event model stored in the data repository 414, based on the received state information. Furthermore, the competition bookkeeper 206 stores user account information, event results, course information, and the like in the data repository 414. Although the modules are described as communicating primarily through the data repository 414, other communication mechanisms are contemplated, including message passing, function calls, pipes, sockets, shared memory, and the like.

The API 410 provides programmatic access to one or more functions of the competition manager 102. For example, the API 410 may provide a programmatic interface to one or more functions of the competition manager 102 that may be invoked by one of the other programs 430 or some other module. In this manner, the API 410 facilitates the development of third-party software, such as user interfaces, plug-ins, news feeds, adapters (e.g., for integrating functions of the competition manager 102 into Web applications), and the like.

In addition, the API 410 may be in at least some embodiments invoked or otherwise accessed via remote entities, such as the media provider 118 and/or the client device 104, to access various functions of the competition manager 102. For example, the client device 104 may transmit state information and/or receive state information to the competition manager 102 via the API 410. In addition, the media provider 118 may provide media content to the competition manager 102 and/or client devices 104 via the API 410.

The competition manager 102 interacts via the communication system 440 with the media provider 118 and the client device 104. The communication system 440 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices.

Other or additional functions and/or data are contemplated. In some embodiments, the competition manager 102 includes a user interface manager (not shown) that provides a view and a controller that facilitate user interaction with the competition manager 102 and its various components. For example, the user interface manager may provide Web based access to the competition manager 102, such that users can create user accounts, register to take part in upcoming distributed sporting events, generate new distributed sporting events, obtain information about their own and other users' past performance, and the like.

Figure 5:
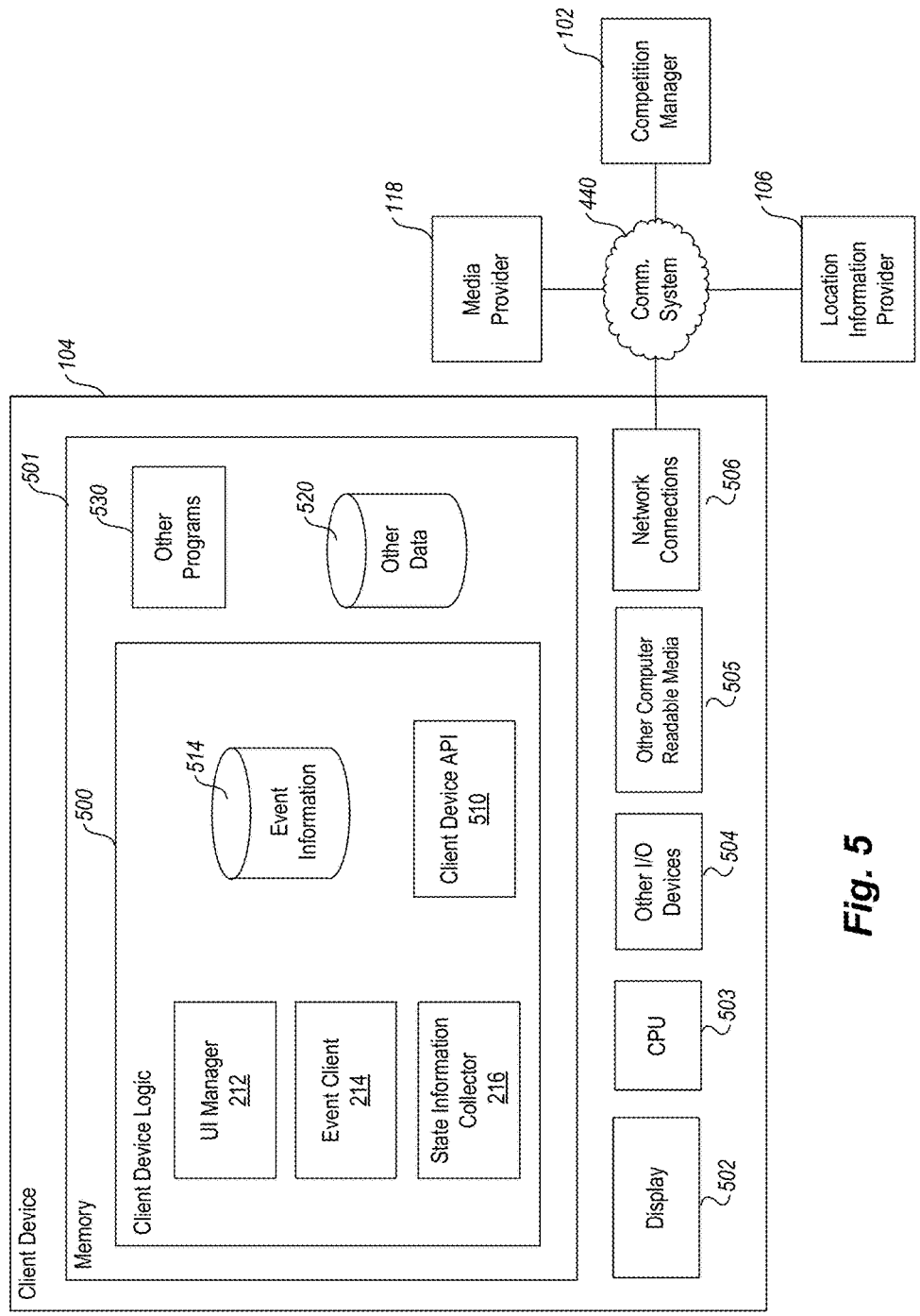
FIG. 5 is a block diagram of an example client device according to an example embodiment.

FIG. 5 is a block diagram of an example client device according to an example embodiment. In particular, FIG. 5 illustrates a possible software implementation of the functions of a client device 104. Typically, the client device 104 is a portable computing device, such as a smart phone, a GPS device, a personal digital assistant ("PDA"), a cycling computer, a wearable computer (e.g., wrist computer), and the like. Note that in the following, each block shown may represent one or more such blocks as appropriate to a specific embodiment or may be combined with other blocks. Also, in other embodiments, the functions of the client device 104 may be implemented in software, hardware, firmware, or in some combination thereof to achieve the capabilities described herein.

In the embodiment shown, client device 104 comprises a computer memory ("memory") 501, a display 502 (e.g., an LCD display), one or more Central Processing Units ("CPU") 503, Input/Output devices 504 (e.g., keyboard, keypad, buttons, mouse, and the like), other computer-readable media 505, and network connections 506. The I/O devices 504 may also include a variety of sensors, such as a thermometer, altimeter, accelerometer, or the like. In some embodiments, the display 502 may be separate from the device 104, such as part of an eyeglass or heads up display. Client device logic 500 (e.g., software instructions and/or data) is shown residing in memory 501. In other embodiments, some portion of the contents, some or all of the components of the client device logic 500 may be stored on and/or transmitted over the other computer-readable media 505. The components of the logic 500 preferably execute on one or more CPUs 503 and facilitate participation in distributed sporting events, as described herein. Other code or programs 530 (e.g., a Web browser, sensor modules, and the like) and potentially other data repositories, such as data repository 520, also reside in the memory 501, and preferably execute on one or more CPUs 503. Of note, one or more of the components in FIG. 5 may not be present in any specific implementation. For example, some embodiments may not provide other computer readable media 505 or data repository 520.

In a typical embodiment, the logic 500 includes a user interface manager 212, an event client 214, a state information collector 216, a client device application program interface ("API") 510, and a data repository 514 that includes event information. The user interface manager 212, an event client 214, a state information collector 216 are described with respect to FIG. 2B, above.

The data repository 514 is used by the other modules (e.g., modules 212, 214, and/or 216) of the client device logic 500 to store and/or communicate information. For example, the state information collector 216 obtains state information from the location information provider 106 and/or local sources (e.g., the I/O devices 504 or one of the other programs 530), and stores the received information in the data repository 514. The event client 214 receives event information from the competition manager 102, including indications of the locations of other players/devices, and stores the received information in the data repository 514. The user interface manager 212 obtains event information from the data repository 514 and displays it on the display 502 and/or the other I/O devices 504. Although the modules are described as communicating primarily through the data repository 514, other communication mechanisms are contemplated, including message passing, function calls, pipes, sockets, shared memory, and the like.

The API 510 provides programmatic access to one or more functions of the client device 104, such that those functions may be invoked by one of the other programs 530 or some other module. In this manner, the API 510 facilitates the development of third-party software, such as user interfaces, plug-ins, adapters, and the like. For example, the API 510 may be utilized to develop a custom user interface for a particular type of client device 104, a plug-in for a Web browser, or the like.

In addition, the API 510 may be in at least some embodiments invoked or otherwise accessed via remote entities, such as the media provider 118, the competition manager 102, and/or the location information provider 106, to access various functions of the client device 102. For example, the competition manager 102 may transmit event information to the client device 104 via the API 510. In addition, the media provider 118 may provide media content to the client device 104 via the API 510.

The client device 104 interacts via the communication system 440 with the media provider 118, the competition manager 102, and the location information provider, as discussed with respect to FIG. 4, above. Although the competition manager 102 and location information provider 106 are shown using a single communication system 440, in other embodiments the competition manager 102 and location information provider 106 may communicate with the client device 104 using distinct communication mechanisms. For example, the location information provider 106 may be a satellite system transmitting messages on a particular radio frequency, whilst the competition manager 102 may utilize Internet protocols via a cellular telephone network or WiMAX network.

In an example embodiment, components/modules of the competition manager 102 and client device 104 are implemented using standard programming techniques. For example, the competition manager 102 and/or client device logic 500 may be implemented as a "native" executable running on the CPUs 403 and 503, along with one or more static or dynamic libraries. In other embodiments, the competition manager 102 or the client device logic 500 may be implemented as instructions processed by a virtual machine that executes as one of the other programs 430 or 530. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. If given this disclosure, a person having ordinary skill in the art would be able to routinely program various computers, software, client devices and the like to perform the described techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the competition manager 102 and client device 104, such as in the data repositories 414 and 514, can be available by standard mechanisms such as through C, C++, C#, and Java APIs; libraries for accessing files, databases, or other data repositories; through markup languages such as XML; or through Web servers, FTP servers, or other types of servers providing access to stored data. The data repositories 414 and 514 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of a media format transcoder.

Furthermore, in some embodiments, some or all of the components of the competition manager 102 and/or the client device 104 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Other architectures than those illustrated in FIGS. 4 and 5 are contemplated. For example, in another embodiment, at least some of the functions of the competition manager 102 are distributed amongst the client devices 104, such that the client devices 104 form a peer-to-peer (P2P) network wherein state information is passed amongst the client devices without first passing through a centralized competition manager 102 or other system.

F. Example Process Logic

Figure 6:
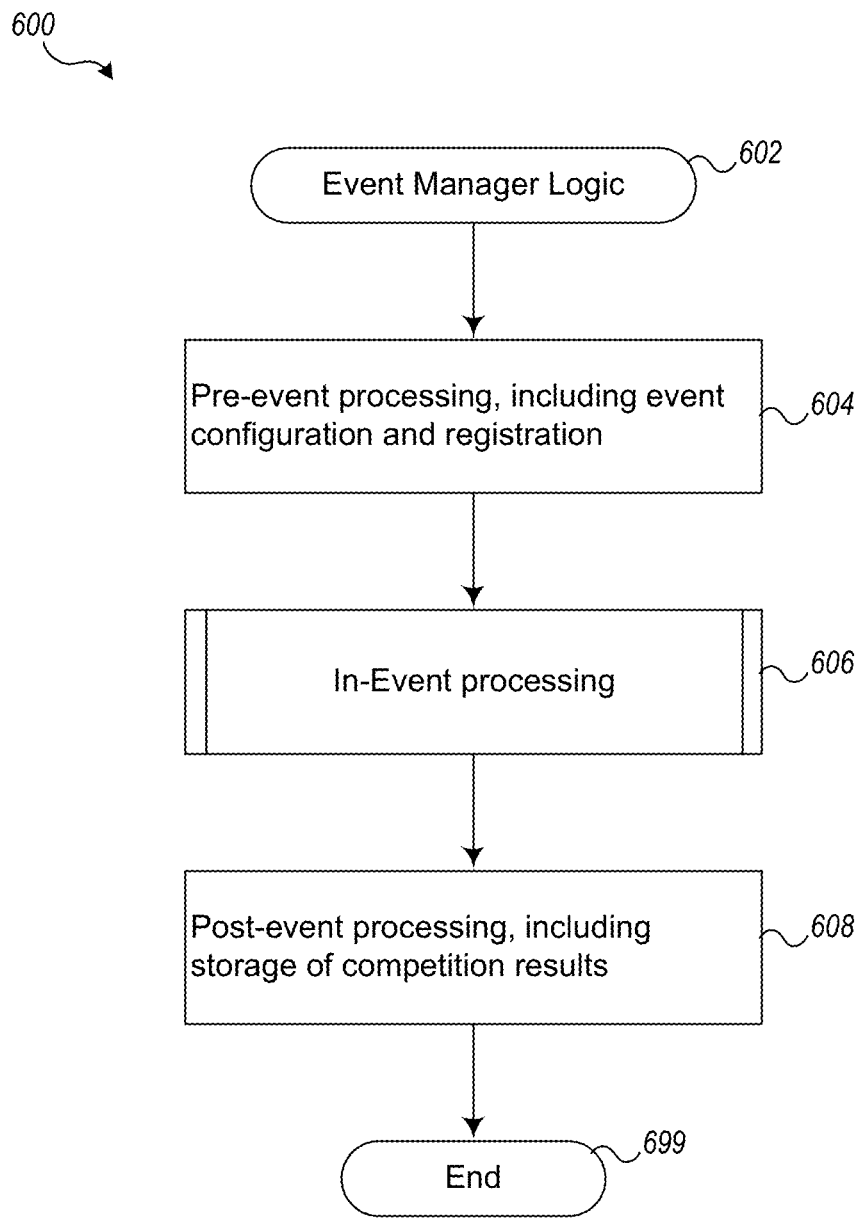
FIG. 6 is a flow diagram of an example competition manager process provided by an example embodiment.

FIG. 6 is a flow diagram of an example competition manager process provided by an example embodiment. In particular, FIG. 6 illustrates a process 600 that may be implemented by, for example, one or more elements of the competition manager 102 as described with respect to FIG. 2B. The process 600 facilitates distributed sporting events.

The illustrated process 600 begins at block 602. At block 604, the process performs pre-event processing, including event configuration and registration. Event configuration includes the creation or generation of new events. For example, a user may interact with the competition manager 102 in order to provide details regarding a particular distributed sporting event, such as timing, for example when the event is to take place; course, such as a map or other representation of a race course; event type, such as kayaking, bicycling, running, or the like; and event rules and the like. In one embodiment, the competition manager 102 provides an interactive graphical user interface, such as via a Web site, that can be used to draw or otherwise specify a new event, manage existing events, and the like.

Event registration includes receiving from each of a plurality of players an indication that they desire to participate in a particular sporting event. In some embodiments, the competition manager provides a list or calendar of upcoming distributed sporting events, and receives indications from players wishing to compete in one or more of those events. Pre-event processing can include other functions as well, such as league management including generating and hosting a series of distributed sporting events having a regular group of players; user account management including creating, updating, deleting user accounts; and the like.

Event registration may also include determining whether a particular geographic location is suitable for holding an instance of a distributed sporting event. For example, a player may register for a particular distributed kayaking event that has a course that is larger than the lake upon which the player is situated. In such circumstances, the process may determine to exclude the player from the event. In other embodiments, the process may modify the event course so that it is suitable for the geographic location of the player, while still maintaining at least some of the characteristics of the event, such as overall length or duration.

At block 606, the process performs in-event processing, such as by executing process 700 described with respect to FIG. 7, below. In at least some embodiments, the process initiates execution of process 700 concurrently, such as by forking a separate process, thread, or the like. In this manner, the process 700 can concurrently facilitate multiple distributed sporting events.

At block 608, the process performs post-event processing, including storage of competition results. In some embodiments, the results of a particular distributed sporting event are stored, such that they may be tallied or aggregated with prior results. Post-event processing may also include presentation of information about various past distributed sporting events, such as league standings, player rankings, player information, and the like.

At block 699, the process ends. In other embodiments, the process may instead continue to one of blocks 604-608 in order to facilitate additional distributed sporting events.

Figure 7:
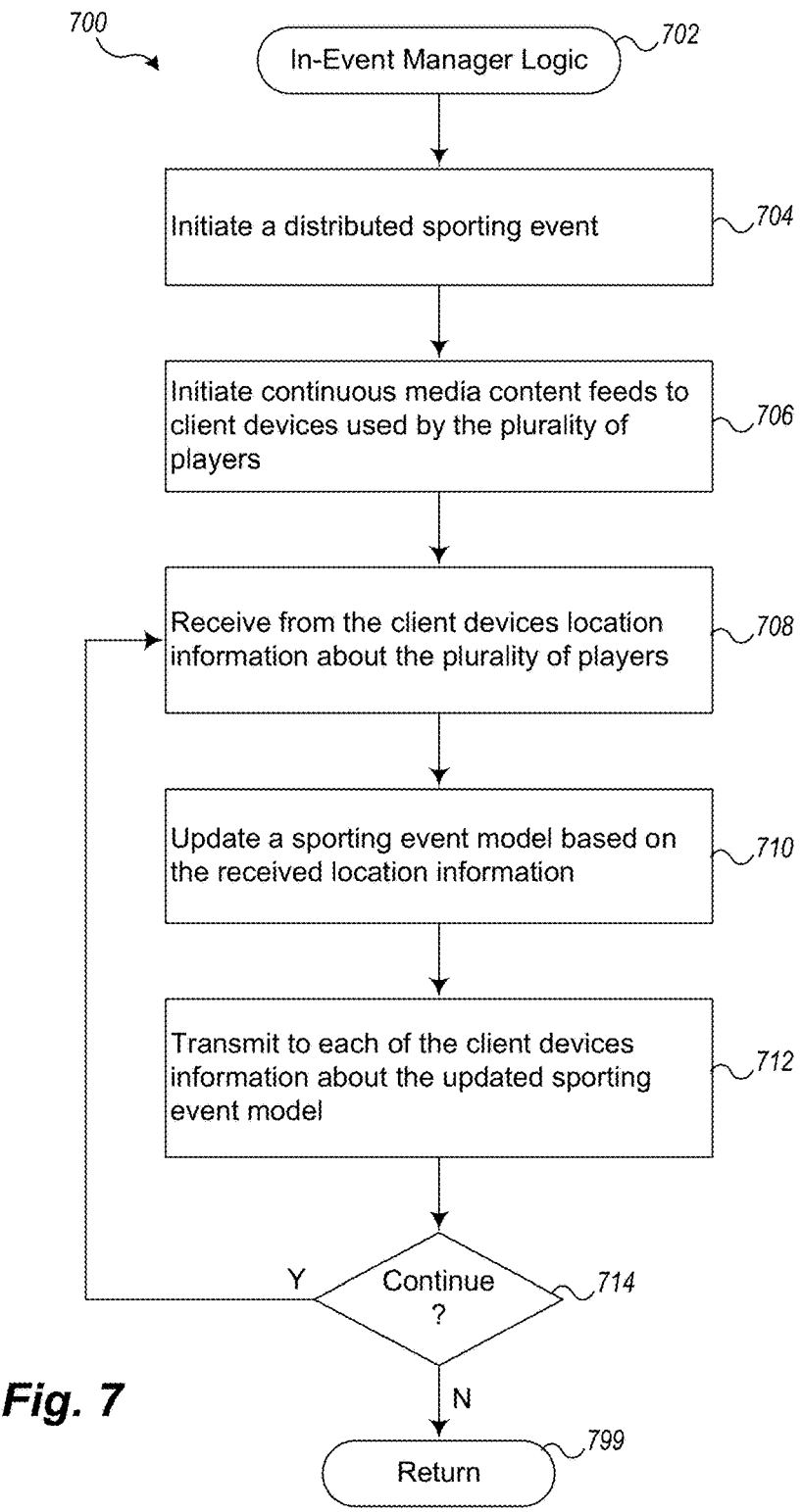
FIG. 7 is a flow diagram of in-event processing performed by an example competition manager according to an example embodiment.

FIG. 7 is a flow diagram of in-event processing performed by an example competition manager according to an example embodiment. In particular, FIG. 7 illustrates a process 700 that may be implemented by, for example, one or more elements of the competition manager 102 as described with respect to FIG. 2B. The process 700 manages a distributed sporting event comprising a plurality of players that are each competing against one another by traveling over a course situated at a location that is remote from other of the plurality of players. The process 700 is typically initiated by process 600, as described above.

The illustrated process 700 begins at block 702. At block 704, the process initiates a distributed sporting event. Initiating the sporting event includes transmitting to client devices (e.g., client devices) used by the plurality of players an indication that the sporting event is beginning or will begin at some future time.

At block 706, the process initiates continuous media content feeds to client devices used by the plurality of players. Initiating media content feeds includes notifying a media provider 118 of the client devices, so that the media provider 118 may begin transmitting media content to the client devices or begin providing other media-related functions, such as chat or instant message services, video streams, advertising streams, and the like. In some cases, the media content is forwarded by the media provider 118 through the competition manager 102 to the client devices, whereas in other embodiments it is transmitted directly by the media provider 118 to the client devices.

At block 708, the process receives from the client devices location information about the plurality of players. As noted, the client devices are configured to transmit, independently or in response to a request from the competition manager 102, location information such as GPS coordinates to the competition manager 102. Other types of state information may also be received, including direction of travel, speed of travel, weather conditions information (e.g., wind direction, precipitation, temperature), course conditions information (e.g., road grade or conditions, wave height), or the like.

At block 710, the process updates a sporting event model based on the received location information. Updating the sporting event model may include as little as transiently recording or otherwise storing the received location information. In other embodiments, updating the sporting event model may include other operations, such as correcting for a lack of parity between at least some of the players and/or courses. Updating the model may include mapping course positions with respect to non-uniform courses as described herein. The process may retain or have access to a table or other structure that maps or represents a correspondence between locations on different derivative courses, which have been established according the above-described techniques. The process may reference this mapping to normalize all players onto one uniform course. In other embodiments, the mapping may be provided to client devices, so that the correspondence function can be performed there.

As also noted, different players may perform at different levels, because of differing course conditions or levels of skill, fitness, wind conditions, or the like. Correcting for a lack of parity may include adjusting the "virtual" or "course" location or distance traveled of the players, based on information about the players and/or the course conditions experienced by the players, to make it appear that the players are performing at more nearly the same level than they actually are. In an example boating (e.g., kayaking) embodiment, the process obtains wind conditions information, such as the direction and speed of the prevailing winds for each of the courses being traveled by the players. The virtual locations of the players are then adjusted (e.g., normalized) based on the obtained wind conditions information. In another approach, the courses traveled by the players may be adjusted, such that players encountering a stronger headwind travel a shorter course. In an example bicycling embodiment, the process adjusts player positions based on obtained wind (e.g., relative strength and angle of prevailing wind with respect to rider direction) and course gradient information (e.g., relative positive or negative angle of slopes being ridden by the riders).

At block 712, the process transmits to each of the client devices information about the updated sporting event model. Transmitting information about the updated sporting event model includes transmitting location information for each of the players. The transmitted location information will typically represent player location as a "course" location that represents the player's location with respect to the course of travel, rather than the physical location. However, in other embodiments, the physical player locations may be transmitted, and adjusted for presentation purposes by each of the client devices. By transmitting information to the client devices, the process causes, in substantially or near real time with respect to movements of the players, each of the client devices to present information about the sporting event, such as the locations of the players with respect to each other and/or the event course.

At block 714, the process determines whether or not to continue. If so, the process continues at block 708 to receive further location information. Otherwise, the process continues at block 799. Typically, the process will continue until the occurrence of a stopping condition, such as when the last player finishes the event by crossing the finish line or withdrawing, when a maximum event time is reached, or the like.

At block 799, the process ends. Some embodiments perform one or more operations/aspects in addition to the ones described with respect to process 700. For example, in one embodiment, process 700 also transmits event instructions, such as helpful hints or advice to improve the performance of one or more players, such as recommended cadences, heart rate, or the like. Such information may be tailored to specific player abilities and/or needs. Event instructions may also include warnings or penalties, based for example on the event rules and the location of a player. In some embodiments, not all of the blocks described above are performed. For example, in one embodiment, the process 700 does not perform block 706.

Figure 8:
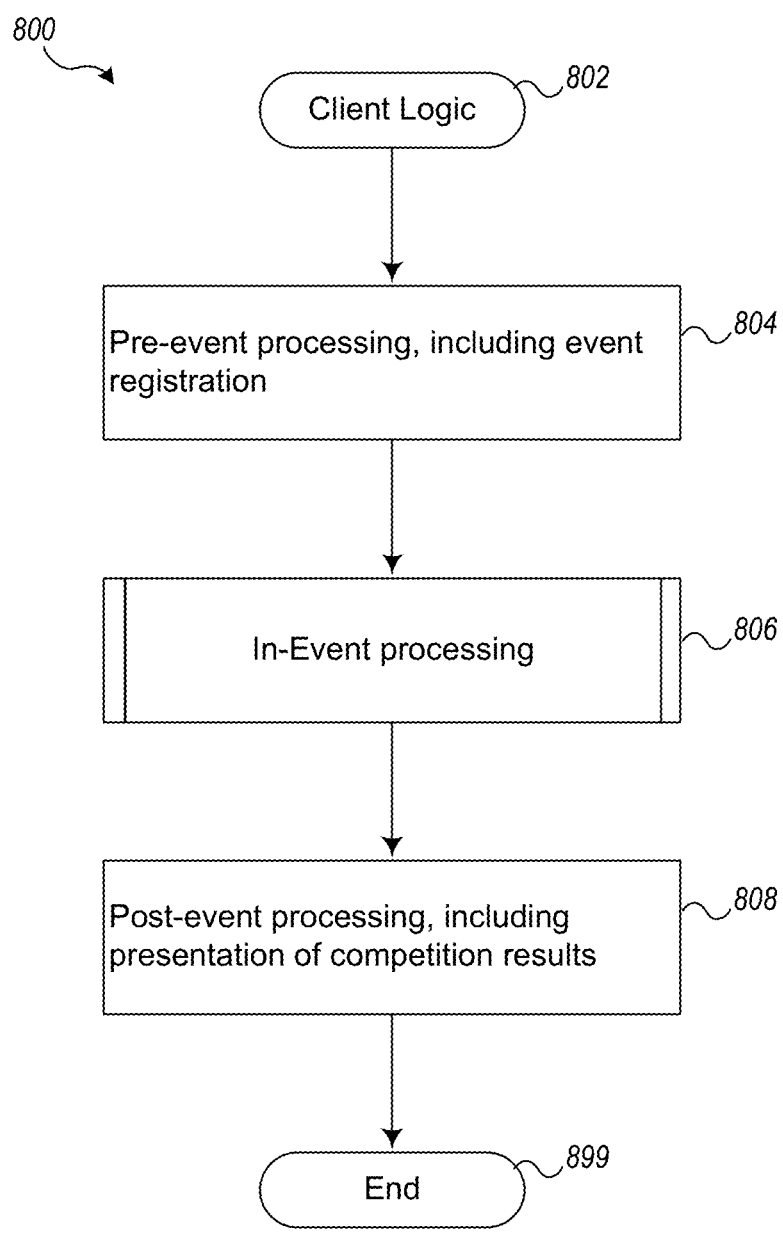
FIG. 8 is a flow diagram of an example client device process provided by an example embodiment.

FIG. 8 is a flow diagram of an example client device process provided by an example embodiment. In particular, FIG. 8 illustrates a process 800 that may be implemented by, for example, one or more elements of the client device 104 as described with respect to FIG. 2B. The process 800 facilitates participation by a player in a distributed sporting event.

The illustrated process 800 begins at block 802. At block 804, the process performs pre-event processing including event registration. Event registration may include transmitting an indication that the player desires to participate in a particular event. Event registration may also include receiving information about the event, such as course details, timing, rules, and the like. Pre-event processing can include other functions, such as user account creation (e.g., signing up for a user account), payment processing (e.g., event and/or league fees paid to the competition manager 102 or other party), and the like.

At block 806, the process performs in-event processing, such as by initiating execution of process 900 described with respect to FIG. 9, below.

At block 808, the process performs post-event processing, including presentation of competition results. Presenting competition results includes displaying final positions, rankings, times, and the like. Post-event processing may also include transmitting competition results to the competition manager 102 for storage or other processing.

At block 899, the process ends. In other embodiments, the process may instead continue to one of blocks 804-808 in order to facilitate participation in additional distributed sporting events.

Figure 9:
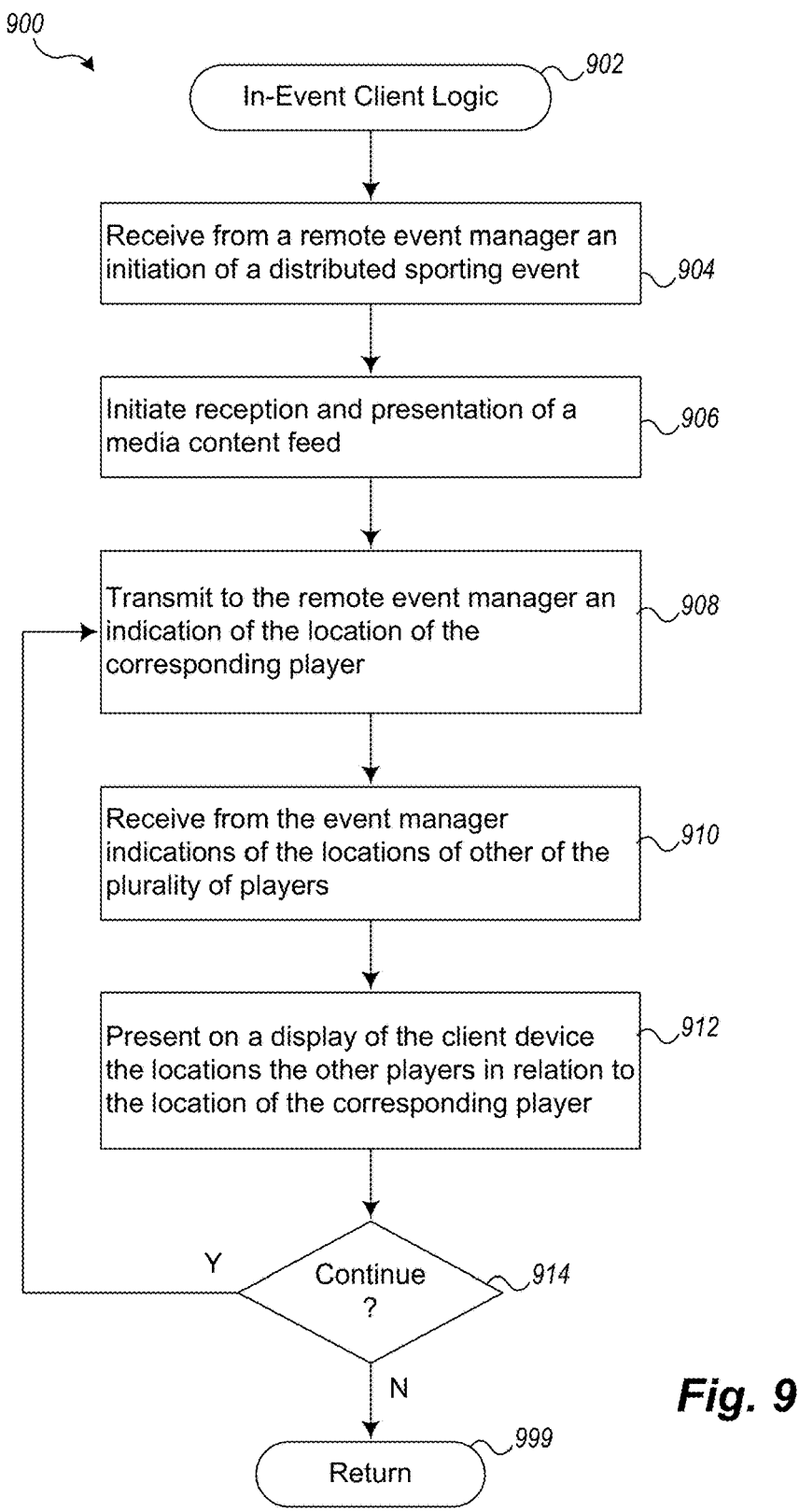
FIG. 9 is a flow diagram of in-event processing performed by an example client device according to an example embodiment.

FIG. 9 is a flow diagram of in-event processing performed by an example client device according to an example embodiment. In particular, FIG. 9 illustrates a process 900 that may be implemented by, for example, one or more elements of the client device 104 as described with respect to FIG. 2B. The process 900 facilitates participation by a player in a distributed sporting event.

The illustrated process 900 begins at block 902. At block 904, the process receives from a remote event manager an initiation of a distributed sporting event. The received initiation may be a start signal or other message notifying the player that the event is presently beginning, or will begin at a specified future time. In response, the process may display an instruction or other message on a display screen or other output device, such as a speaker.

At block 906, the process initiates reception and presentation of a media content feed. Typically, the process starts a thread or forks a process to handle one or more media content feeds concurrently with the functions described below. The forked process or thread manages the reception and display of media content or related services (e.g., messaging services).

At block 908, the process transmits to the remote event manager, such as the competition manager 102, an indication of the location of the corresponding player. The transmitted location indication may include physical location information as well as orientation, altitude, velocity, and the like, and may be obtained by the client device from one or more location information provider modules that are remote from or local to the client device, such as a satellite system, accelerometer, compass, altimeter, or the like.

At block 910, the process receives from the event manager indications of the locations of other of the plurality of players. The received location indications may be the actual, physical location of each of the other players, or may be their locations with respect to a uniform, virtual course, so that the positions of the players may be readily displayed with a minimum of processing, so as to avoid the need to perform position or coordinate translation on the client device.

At block 912, the process presents on a display of the client device the locations of the other players or devices in relation to the location of the corresponding player. Displaying the locations of the other players typically occurs in substantially or near real time with the movements of the other players. Typically, displaying the locations of the other players includes displaying a map with icons (or other user interface elements) indicating the positions of the players. Other information, such as rankings, projected times, and the like, may be displayed in addition or instead, as described with respect to FIGS. 3A-3F, above.

At block 914, the process determines whether or not to continue. If so, the process continues at block 908 to transmit further location information to the remote event manager. Otherwise, the process continues at block 999. Typically, the process will continue until the occurrence of a stopping condition, such as when the process receives a stop signal from the competition manager, when the last player finishes the event by crossing the finish line or withdrawing, when a maximum event time is reached, or the like.

At block 999, the process ends. Some embodiments perform one or more operations/aspects in addition to the ones described with respect to process 900. For example, in one embodiment, process 900 also records and transmits biometric information about the player, such that the information can be analyzed (in real time or after the event) so that performance improvement advice can be provided to the player. In some embodiments, not all of the blocks described above are performed. For example, in one embodiment, the process 900 does not perform block 906.

All of the above U.S. patents, U.S. patent application publications, U.S. patent applications, foreign patents, foreign patent applications and non-patent publications referred to in this specification and/or listed in the Application Data Sheet, including but not limited to: U.S. patent application Ser. No. 14/103,561, entitled "Disparity Correction for Location-Aware Distributed Sporting Events," filed Dec. 11, 2013; U.S. Provisional Patent Application No. 61/818,691, entitled "Disparity Correction for Location-Aware Distributed Sporting Events," filed May 2, 2013; U.S. patent application Ser. No. 13/717,287, entitled "Location-Aware Distributed Sporting Events," filed Dec. 17, 2012 and issued as U.S. Pat. No. 8,897,903 on Nov. 25, 2014; U.S. patent application Ser. No. 13/077,682, entitled "Location-Aware Distributed Sporting Events," filed Mar. 31, 2011 and issued as U.S. Pat. No. 8,333,643 on Dec. 18, 2012; U.S. patent application Ser. No. 12/816,981, entitled "Location-Aware Distributed Sporting Events," filed Jun. 16, 2010 and issued as U.S. Pat. No. 7,934,983 on May 3, 2011; U.S. Provisional Patent Application No. 61/264,151, entitled "Systems and Methods for Location-Aware Distributed Competitions," filed Nov. 24, 2009, are incorporated herein by reference, in their entireties.

From the foregoing it will be appreciated that, although specific embodiments have been described herein for purposes of illustration, various modifications may be made without deviating from the spirit and scope of the invention. For example, the methods and systems for facilitating distributed sporting events discussed herein are applicable to other architectures. For example, the techniques can be used in a non-competitive context, such as for individual training (e.g., in a time-shifted manner), for group/team training exercises, and the like. Also, the methods and systems discussed herein are applicable to differing mobile device protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method for facilitating a distributed sporting event, the method comprising:
aggregating a plurality of individual sporting activities into a distributed sporting event comprising a plurality of players that are each performing one of the individual sporting activities, that are each competing against one another by traveling over non-uniform courses that are remotely located from one another, and that each have a corresponding client device, by:
receiving from each of the plurality of client devices information about a current location of the corresponding player;
determining, for each of the players, a location on an anchor course that corresponds to the current location of the player, wherein determining the location on the anchor course includes mapping the current location of the player to the location of the anchor course based on a correspondence between locations on the anchor course and locations on a current course traveled by the player; and
causing each of the plurality of client devices to present indications of positions of at least some of the other players with respect to the corresponding player, the indicated positions based on the locations on the anchor course of the at least some of the plurality of players.

2. The method of claim 1, further comprising asserting a course to each of the plurality of players by causing each of the client devices to display specific instructions to the corresponding player to travel over a specified path.

3. The method of claim 1, further comprising generating the correspondence between locations by:
creating and recording a mapping between locations on a derivative course and locations on the anchor course, so that each of the multiple locations on the anchor course has a corresponding location on the derivative course.

4. The method of claim 3, further comprising:
as a first reference athlete travels over the anchor course, recording, for each of the multiple locations on the anchor course, a corresponding elapsed time from the beginning of the anchor course to the location;
recording, as a second reference athlete travels over the derivative course, a corresponding distance measured at each elapsed time recorded with respect to the anchor course; and
creating the mapping based on the recorded times and distances.

5. The method of claim 4, further comprising:
averaging elapsed times recorded with respect to multiple reference athletes traveling over the anchor course; and
recording the corresponding distances for the second reference athlete with respect to the average elapsed times.

6. The method of claim 3, wherein the multiple locations on the anchor course are distributed along the anchor course a uniform distance from one another, wherein the uniform distance is in a range between 0.05 km and 0.1 km.

7. The method of claim 3, wherein the derivative course is the current course traveled by one of the plurality of players.

8. The method of claim 3, further comprising:
translating each of the corresponding distances on the derivative course into a latitude/longitude coordinate representing a location on the derivative course.

9. The method of claim 8, wherein receiving from each of the plurality of client devices information about the current location of the corresponding player includes receiving an indication that the player has traveled by one of the locations on the derivative course represented by one of the latitude/longitude coordinates.

10. The method of claim 9, wherein receiving from each of the plurality of client devices information about the current location of the corresponding player includes receiving an offset from one of the locations on the derivative course represented by one of the latitude/longitude coordinates, the offset representing a time, distance, and/or angle between the player and the location on the derivative course.

11. The method of claim 3, wherein the multiple locations on the anchor course are distributed along the anchor course a non-uniform distance from one another, wherein the distance between the multiple locations is dynamically selected based on the speed of the first reference athlete traveling over the anchor course, such that the distance between locations is shorter when the first reference athlete is slower.

12. The method of claim 1, wherein causing each of the plurality of client devices to present indications of positions of at least some of the other players includes:

for a first player, translating the current location of the first player to a corresponding location on the anchor course;

for a second player, translating the current location of the second player to a corresponding location on the anchor course; and displaying a representation of the anchor course along with indications of the corresponding locations of the first and second players on the anchor course.

13. The method of claim 1, wherein the players are each engaging in a same sport that is one of: bicycling, running, cross country skiing, motor racing, or boating.

14. A computing system for facilitating a distributed sporting event, comprising:
a memory;
a processor; and
a module that is stored on the memory and that is configured, when executed by the processor, to aggregate a plurality of individual sporting activities into a distributed sporting event comprising a plurality of players that are each performing one of the individual sporting activities, that are each competing against one another by traveling over non-uniform courses that are remotely located from one another, and that each have a corresponding client device, by:
receiving from each of the plurality of client devices information about a current location of the corresponding player;
determining a location on a course depicted on one of the client devices, the determined location corresponding to the current location of the player by mapping the current location of the player to the location on the depicted course based on a correspondence between locations on the depicted course and locations on a current course traveled by the player, wherein the depicted course is an anchor course that is not the same as the current course traveled by the player; and
causing the one client device to present the depicted course along with indications of positions of at least some of the other players with respect to the corresponding player, the indicated positions based on the locations on the depicted course of the at least some of the plurality of players.

15. The system of claim 14, wherein the computing system is an event controller in communication with the client devices.

16. The system of claim 14, wherein the computing system is the one client device.

17. The system of claim 14, wherein the module is further configured to create and record a mapping between locations on a derivative course and locations on the anchor course, so that each of the multiple locations on the anchor course has a corresponding location on the derivative course, wherein the mapping is based on times and/or distances recorded from travel of a first reference athlete over the anchor course and times and/or distances recorded from travel of a second reference athlete over the derivative course.

18. A non-transitory computer-readable medium storing contents that are configured to cause a computing system to facilitate a distributed sporting event by performing a method comprising:
aggregating a plurality of individual sporting activities into a distributed sporting event comprising a plurality of players that are each performing one of the individual sporting activities, that are each competing against one another by traveling over non-uniform courses that are remotely located from one another, and that each have a corresponding client device, by:
receiving from each of the plurality of client devices information about a current location of the corresponding player;
determining a location on a course depicted on one of the client devices, the determined location corresponding to the current location of the player by mapping the current location of the player to the location on the depicted course based on a correspondence between locations on the depicted course and locations on a current course traveled by the player, wherein the depicted course is an anchor course that is not the same as the current course traveled by the player; and
causing the one client device to present the depicted course along with indications of positions of at least some of the other players with respect to the corresponding player, the indicated positions based on the locations on the depicted course of the at least some of the plurality of players.

19. The computer-readable medium of claim 18, wherein the contents are instructions configured to cause the one client device to perform the method.

20. The computer-readable medium of claim 18, wherein the non-uniform courses differ from each other in course length and/or elevation profile.

* * * * *